June 5, 1945.  A. H. DICKINSON  2,377,764
ACCOUNTING MEANS
Filed Oct. 24, 1940    8 Sheets-Sheet 1

INVENTOR
Arthur H. Dickinson
BY
ATTORNEY

June 5, 1945.  A. H. DICKINSON  2,377,764
ACCOUNTING MEANS
Filed Oct. 24, 1940  8 Sheets-Sheet 2
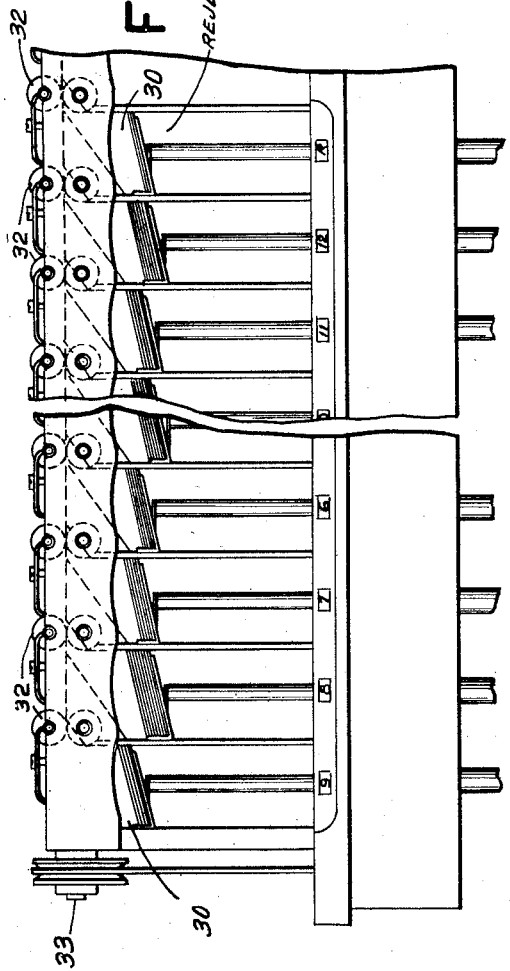
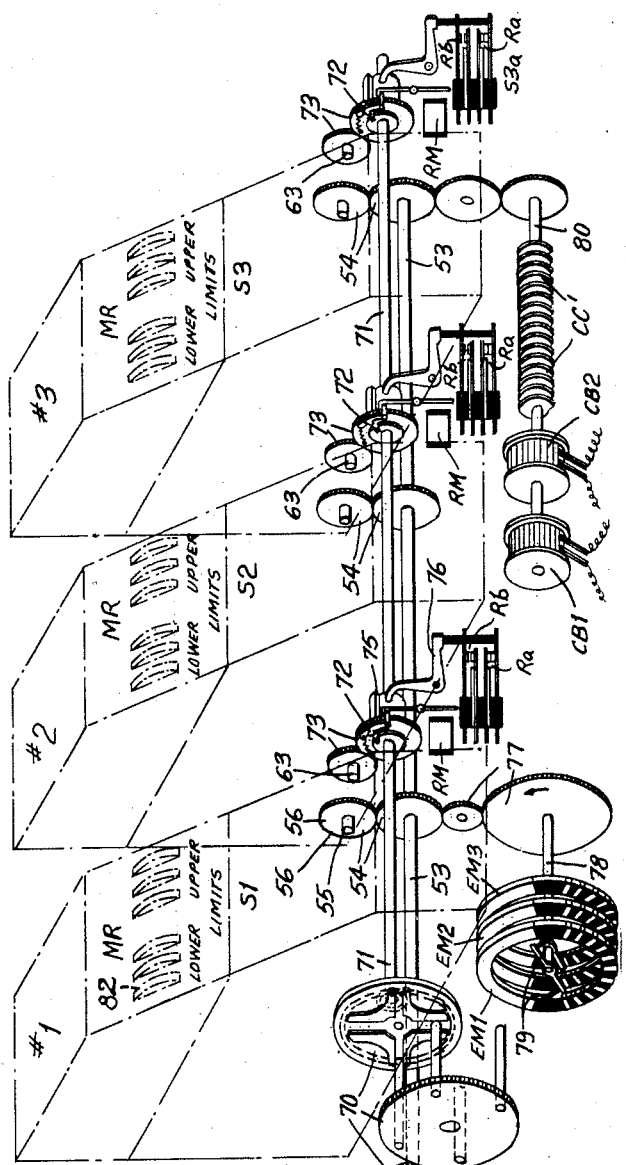
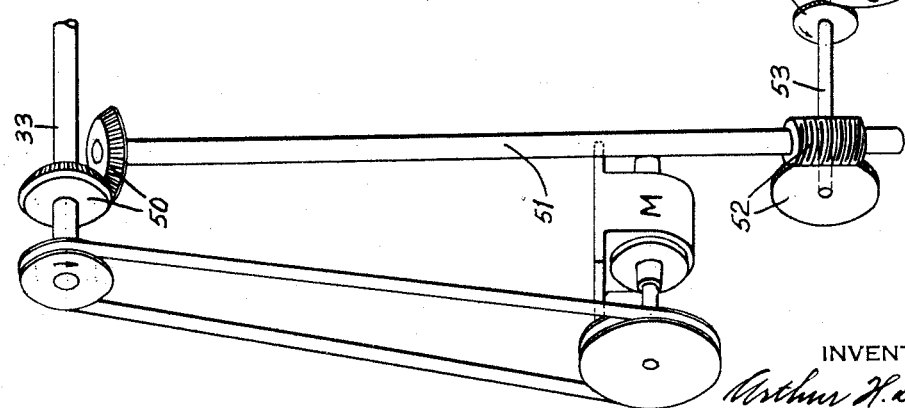
INVENTOR
Arthur H. Dickinson
BY
ATTORNEY June 5, 1945.   A. H. DICKINSON   2,377,764
ACCOUNTING MEANS
Filed Oct. 24, 1940   8 Sheets-Sheet 3

INVENTOR
Arthur H. Dickinson
BY
ATTORNEY

June 5, 1945.  A. H. DICKINSON  2,377,764
ACCOUNTING MEANS
Filed Oct. 24, 1940  8 Sheets-Sheet 4

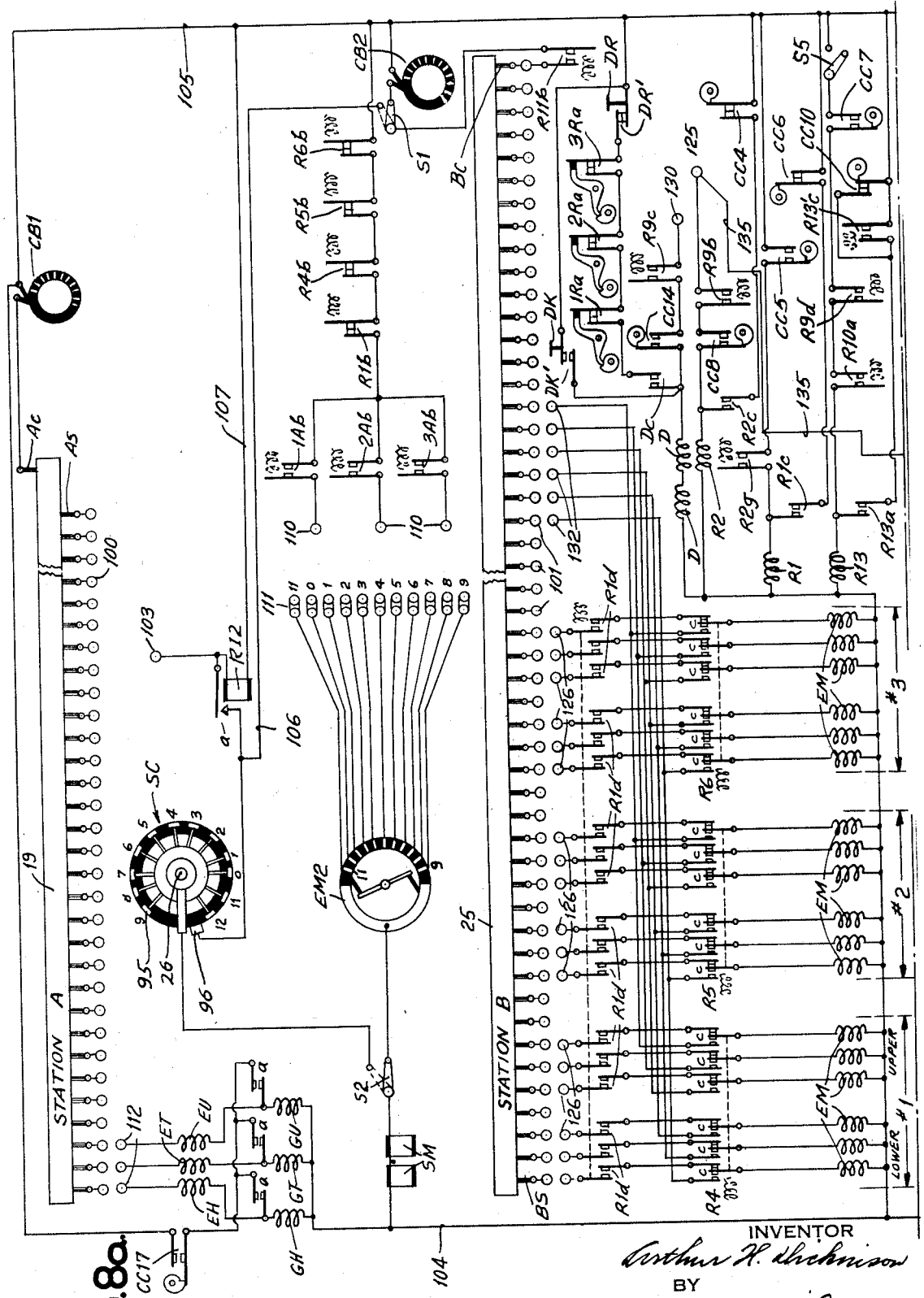

June 5, 1945.　　　A. H. DICKINSON　　　2,377,764
ACCOUNTING MEANS
Filed Oct. 24, 1940　　　8 Sheets-Sheet 6

INVENTOR
Arthur H. Dickinson
BY
ATTORNEY

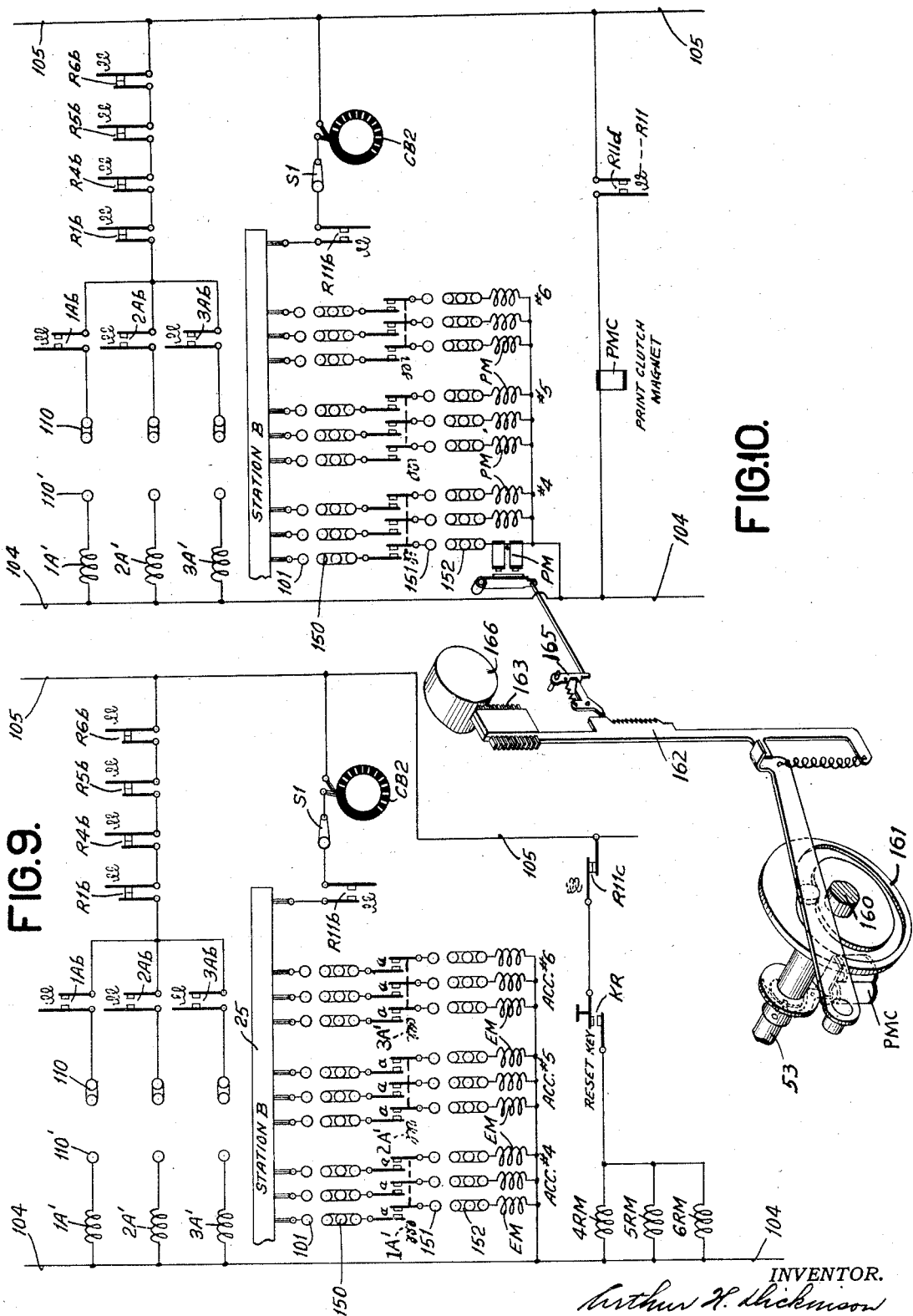

Patented June 5, 1945

2,377,764

UNITED STATES PATENT OFFICE 2,377,764

ACCOUNTING MEANS

Arthur H. Dickinson, Scarsdale, N. Y., assignor to International Business Machines Corporation, New York, N. Y., a corporation of New York Application October 24, 1940, Serial No. 362,499

13 Claims. (Cl. 209—110)

This invention relates to accounting means, particularly record sorters, controlled by and operating on records bearing data.

The record referred to has a plurality of columns of differentially disposed index positions adapted for perforation according to a suitable code to represent data. According to the Hollerith code used for the present purposes, each column includes ten index positions known as the 9, 8 . . . 1, 0 positions adapted to be singly perforated to represent the value denoted by the position. For instance, a perforation in the "4" position of a column represents digit 4.

In general, a sorting machine is adapted to direct records to different destinations according to the values sensed in a selected column of the records. This may be referred to as regular or ordinary sorting, illustrated, for example, in Patent No. 1,741,985. It has also been proposed in Patent No. 1,989,840 to sort records according to whether values sensed thereon lie between or outside a single range of upper and lower limiting values. Further, in Patent No. 2,172,328, means are disclosed to direct records to one destination if a value is below the lower limit of a range of limits, to another destination if the value is between the limits, and to a third destination if the value is above the upper limit, with the limits being determined from the card to be sorted.

Previously, it has been unknown in a single run of a stack of records to determine whether the values on the records lie between more than one range of limits.

An object of the present invention is to provide means whereby records may be segregated in different groups during a single run of the records through the machine in accordance with whether values on the records fall between one or another range of limits of a plurality of limit ranges. One specific example of the application of such sorting operation is in the field of public utility accounting. For instance, electricity may be sold at different rates depending on whether the consumption by a consumer is within one range or another of kilowatt hours. Thus, the rate blocks might be 5 cents a kilowatt hour for a consumption between 1 and 200 kwh., 4 cents a kilowatt hour for a consumption between 201 and 1000 kwh., and 3 cents a kilowatt hour for a consumption between 1001 and 2000 kwh. According to the present invention, the records may be separated during one run into three groups, each containing the records whose consumption amount is within a different range of limits. Cards whose consumption amounts are outside all the limits will be sent to a reject pocket.

Another object of the invention is to provide means for comparing the values on the records with either manually or automatically set limit ranges.

An object is, further, to provide means for setting up a range of limits derived automatically from a special record and retaining such limits for comparison with the value of a following record or the values of a plurality of following records.

An object is, still further, to provide means whereby a special record will cancel a previous range of limits before setting up a new range of limits represented on the special record.

It is also an object to provide for a plurality of ranges of limits to be derived from a single special record.

Another object is to provide for each of a plurality of limit ranges to be derived from each of a plurality of successive special records, each of which will enter new limits into a particular limit receiving means, selected by a characteristic of the record, without effecting the limits set up in another limit receiving means.

Still another object is to provide means for controlling operations according to adjoining limit ranges in which the upper limit of one range is equal to the lower limit of the next range, in such a manner that a suitable one of the ranges will dominate the operations, preferably the upper range.

The principles of the invention, while applicable particularly to record sorters, also may find application to other accounting apparatus. For instance, entries into accumulators may be determined according to which of a plurality of limit ranges includes a detail value of a record. Another example is the selective recording of data on a detail record according to whether a detail value on the record is within one or another range of limits. It is, therefore, to be understood that the term accounting means or the like may be used to embrace sorting, accumulating, recording, or other suitable accounting means.

Other objects of the invention will be pointed out in the following description and claims and illustrated in the accompanying drawings, which disclose, by way of example, the principle of the invention and the best mode, which has been contemplated, of applying that principle.

In the drawings:

Fig. 3 shows the main drive of the sorting machine in perspective and diagrammatically shows in perspective the limit receiving sections;

Fig. 4 shows the part of the sorting machine which is a combination of the part shown in Fig. 1;

Figure 8B:
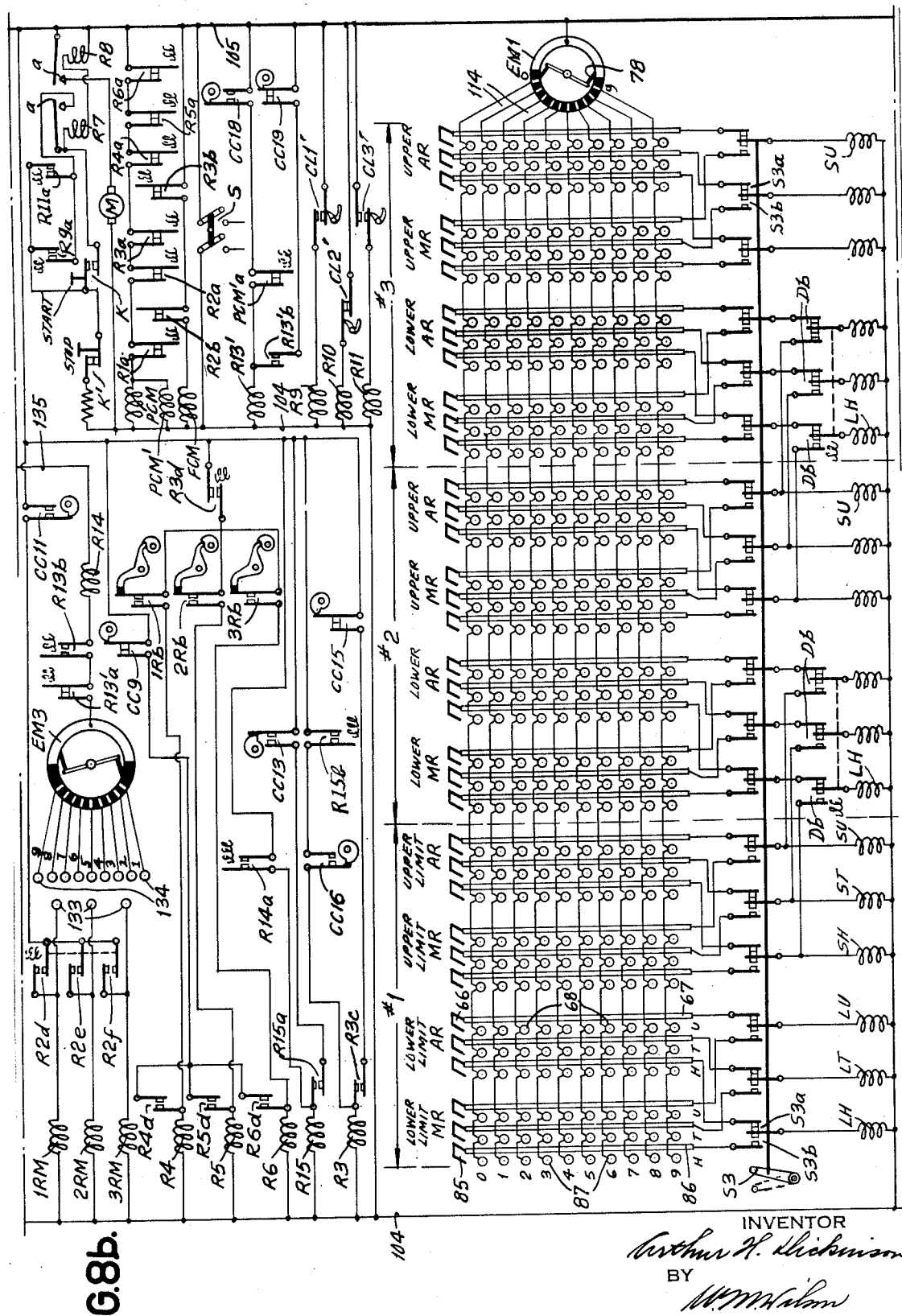
Figure 8C:
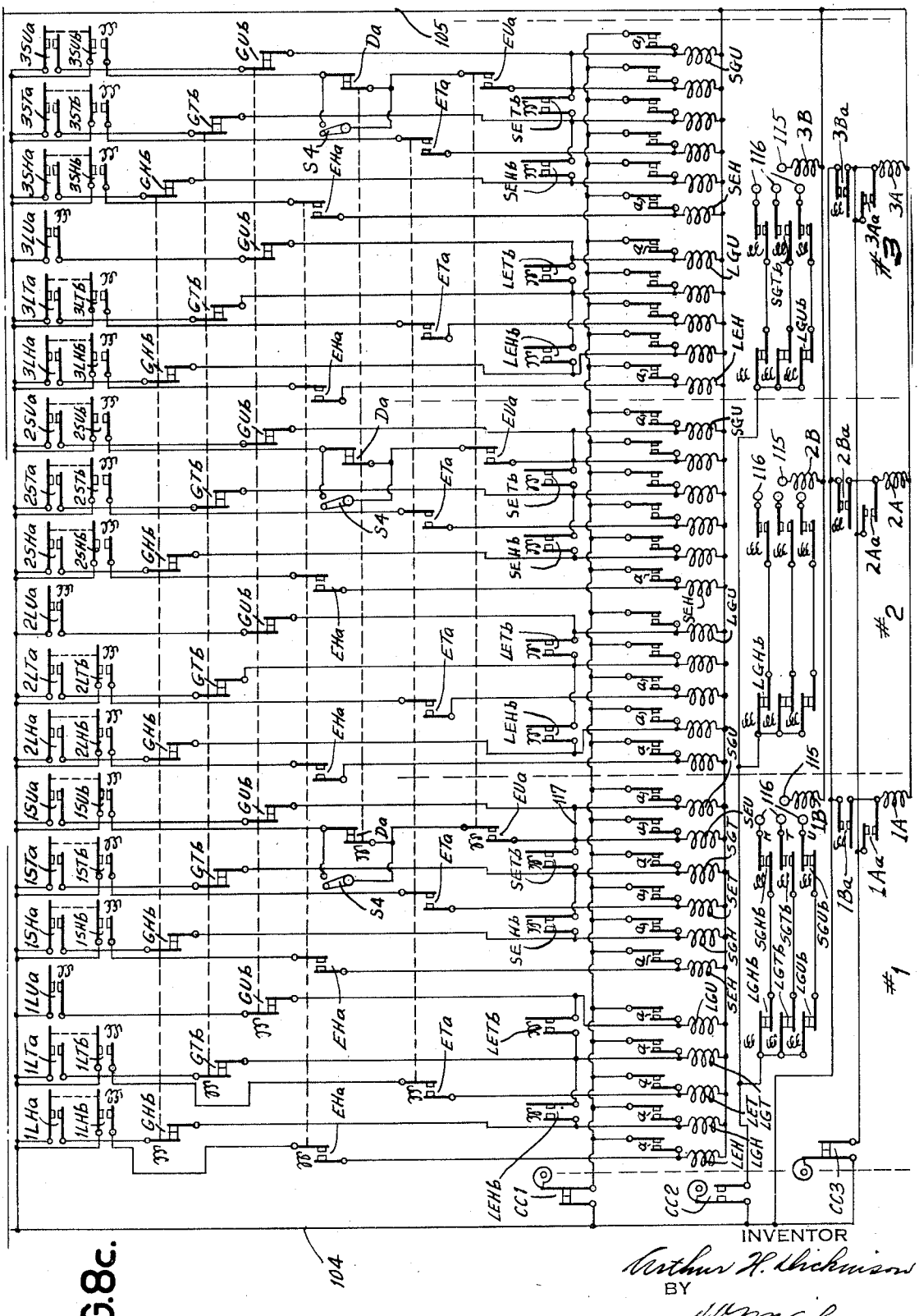

Figs. 8a, 8b, and 8c are successive parts of the circuit diagram of the machine;

Fig. 9 is a circuit showing the application of the invention to accumulators; and Fig. 10 is a circuit showing the invention in connection with printing means.

The principles of the invention will be explained in connection with sorting, accumulating, and printing. The sorting embodiment, which is the preferred form of the invention, will be explained first, in detail.

The sorting machine

The invention is disclosed as an example in connection with a sorting machine such as disclosed in Patent No. 1,741,985, and additions and changes have been made to adapt the machine to the purposes of the present invention.

Figure 1:
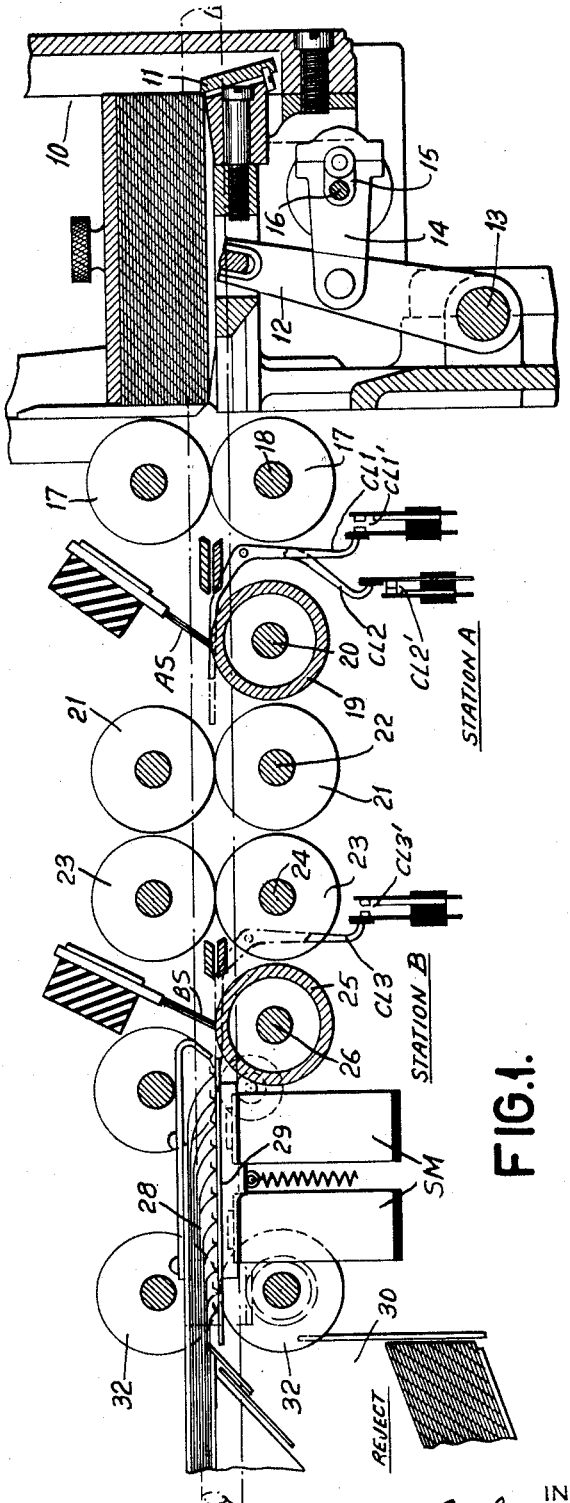
Fig. 1 is a sectional elevation of part of the sorting machine.

Referring to Fig. 1, the machine has a supply hopper 10 for a stack of cards to be sorted. A picker slide 11 is pivotally connected to a lever arm 12 on a shaft 13. Arm 12 is connected by a connecting rod 14 to a crank arm 15 of a crank shaft 16 which may be termed, for convenience, the picker shaft. For smoothness of operation, a duplicate arm 12 and a duplicate picker 11 (only one of each is shown) are provided and operated in the manner generally disclosed in Patent No. 1,909,576. During a revolution of crank shaft 16, the pickers 11 are reciprocated and on the forward stroke feed the bottom card out of the hopper to a pair of feed rolls 17, the lower one of which is fixed to a shaft 18. Feed rolls 17 advance the card through a preliminary analyzing station A at which a row of conductive sensing brushes AS, one for each card column is provided for coaction with a contact roll 19 fixed to a shaft 20.

Three card levers are provided. Two of these, designated CL1 and CL3, are located in tandem to be engaged by the left hand marginal portions of the cards (see Fig. 7), while the third card lever, designated CL2, is located for engagement by the right hand marginal portions of the cards. Card lever contacts CL1' and CL3' coact with card levers CL1 and CL3, respectively. These card lever contacts are normally open and are closed when the associated card levers are rocked to counterclockwise positions by cards riding over them. Card lever contacts CL2' which coact with card lever CL2 are normally closed. When a card rides over card lever CL2, it holds card lever CL2 in counterclockwise position in which it maintains card lever contact CL2' open. The card levers CL1 and CL3 are arranged side by side for simultaneous engagement by a card. As the card moves through the station A, it operates card lever CL1 to close contacts CL1' and operates card lever CL2 to open contacts CL2'.

Emerging from station A, the card moves between feed rolls 21, the lower of which is mounted on a shaft 22. The card proceeds to a pair of feed rolls 23, the lower one of which is fixed to a shaft 24. These feed rolls advance the card through a second analyzing station B provided with a row of sensing brushes BS and a contact roll 25 mounted on a shaft 26, similar to the corresponding elements at analyzing station A. As the card moves through the second analyzing station, it keeps the card lever CL3 in counterclockwise position in which contacts CL3' are closed.

The card as it leaves station B is guided below the entrance ends of sorting blades 28. The entrance ends are inherently downwardly biased and normally sustained from dropping by engaging the top of the armature plate 29 of a sorting magnet SM. When magnet SM is energized, armature plate 29 rocks downwardly permitting dropping of the entrance ends of those blades 28 not sustained by engagement with the card. As a result, a path is formed between the first dropped blade in front of the card and the adjacent blade sustained by the card and the card feeds through this path to one of the sorting pockets 30 (also see Fig. 4). Each pair of blades 28 leads to a different pocket 30 (see Fig. 4) which may be referred to as a card destination. Ordinarily, there are twelve pockets 30, known as the 9, 8 . . . 1, 0, 11, and 12 pockets and another pocket known as the reject pocket R. The path opened between a pair of blades for directing the card to a pocket depends on how far the card has advanced below the entrance ends of the blades when magnet SM is energized. In relation to the machine cycle (Fig. 6), the sorting selection depends on the differential time of energization of magnet SM. When the magnet is not energized during a cycle, the card feeds beneath all the blades to the reject pocket. The card is fed to the selected pocket by successive pairs of feed rolls 32.

The drive means comprises a motor M (Fig. 3) having a belt and pulley connection to an upper horizontal shaft 33. The usual worm gearing is provided between the shaft 33 and the shafts of the lower feed rolls 32. The upper feed rolls are friction-driven from the lower feed rolls.

Figure 2:
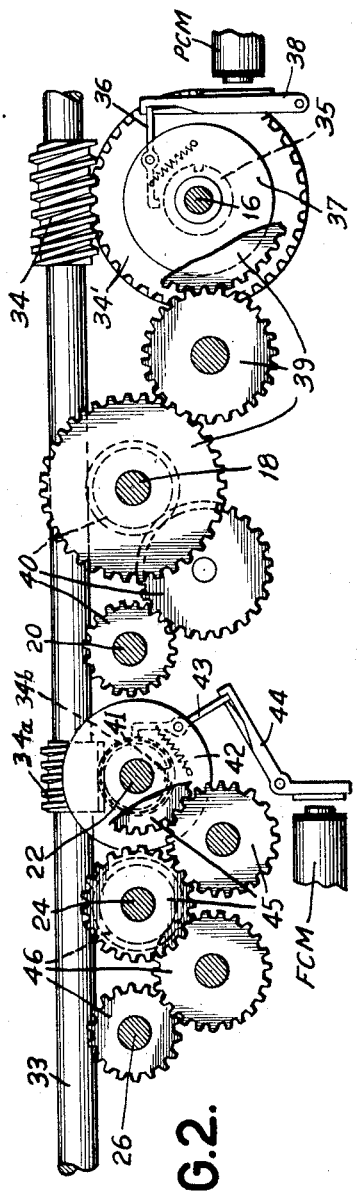
Fig. 2 is a sectional elevation of clutch-driven picker and feed means of the sorting machine.

The picker means, the feed rolls, and the contact rolls, all in front of the sorting blades, are not directly operated by gearing from shaft 33. Instead, for the purposes of the present invention, one-revolution clutch means is provided between shaft 33 and the movable parts in front of the sorting blades. Referring to Fig. 2, shaft 33 has a worm 34 meshed with a worm wheel 34' the hub of which is rotatably carried by picker shaft 16. Rigidly fastened to the hub of worm wheel 34' is a clutch collar 35 with a single notch adapted to receive the nose of a clutch dog 36. Clutch dog 36 is carried by a plate 37 fixed to shaft 16. When the tail of the clutch dog is latched by the armature lever 38 of the picker clutch magnet PCM, the clutch dog is disengaged from the clutch collar.

When magnet PCM is energized, the clutch dog engages the notch in clutch collar 35 at the D point of a cycle (see Fig. 6) to couple the shaft 16 to the worm wheel 34' for rotation at the rate of one revolution each cycle. When magnet PCM is deenergized, the armature lever 38 intercepts the clutch dog and declutches shaft 16 at the end of a cycle. Gearing 39 is provided between shaft 16 and shaft 18 of lower feed roll 17. Further gearing 40 is provided between shaft 18 and the shaft 20 of contact roll 19 of station A. Thus, picker-operating shaft 16, the feed rolls 17, and contact roll 19 are all driven through one-revolution clutch means under control of magnet PCM.

Likewise, feed rolls 21 and 23 and contact roll 25 are driven through similar clutch means from shaft 33. As indicated in Fig. 2, a worm 34a and coacting worm wheel 34b rotate a clutch collar 41 from the shaft 33. The clutch collar 41 and the rigidly connected worm wheel are rotatably mounted on shaft 22 of the lower feed roll 21. Fixed to shaft 22 is a plate 42 carrying a clutch dog 43 latched by armature 44 of a feed clutch magnet FCM. Energization of this magnet results in clutch dog 43 coupling shaft 22 to collar 41 at the D point of a cycle for rotating shaft 22 at the rate of one revolution each cycle. Deenergization of magnet FCM causes shaft 22 to be declutched at the end of a cycle. Gearing 45 is provided between shaft 22 and shaft 24 of the lower feed roll 23, and further gearing 46 is provided between shaft 24 and shaft 26 of contact roll 25 of station B. Thus, feed rolls 21 and 23 and contact roll 24 are driven through one-revolution clutch means controlled by magnet FCM.

Analyzing stations A and B are spaced apart the equivalent of a cycle and so that when a row of index positions of one detail card C (Fig. 7) is at station A, the corresponding row of a preceding detail card is in similar position with respect to station B.

The present invention provides for the sorting of a promiscuous stack of cards during a single run to different pockets depending on which of selected limit ranges contains a detail value in a selected card field of the detail cards. By a limit range is meant the values between and inclusive of upper and lower value limits. These limit ranges may be manually or automatically set up. The automatic setting up of limit ranges is effected by entering upper and lower limits from limit cards CM, CMD, CS, or CSD (Fig. 7) into entry receiving means in a manner which will be explained subsequently in the description of the circuits. The entry receiving means for receiving limits from the limit cards is contained in three sections #1, #2 and #3 (see Fig. 3). Each section has a left hand group of three orders; units, tens, and hundreds, for receiving the lower limit and a right hand group of three orders; units, tens, and hundreds, for receiving the upper limit of a limit area, as indicated diagrammatically in the circuit diagram, Fig. 8b. In the present case, for convenience, the entry receiving means comprises accumulator structures of the kind disclosed in Patent No. 1,976,617. Each accumulator order will receive a digital value entry from a limit card and store the entry until a subsequent limit card is detected by the machine and causes zeroizing and entry of a new value in the accumulator order. Since, in the present usage, the accumulator structures do not add successive entries, the usual carry means between the accumulator orders will not operate and may be omitted, if desired. The accumulator structures will hereinafter be referred to as limit storing means or as limit registers.

The operating means for the limit registers comprises bevel gearing 50 (Fig. 3) between shaft 33 and a vertical shaft 51 which through worm gearing 52 rotates a lower horizontal shaft 53. Pairs of gears 54 drive shafts 55 from shaft 53. Each shaft 55 is the drive shaft of one of the sections and through gearing 56 (also see Fig. 5) rotates a shaft 57. Shaft 57 acts through gearing 58 to rotate the usual clutch shaft 59. Rotatably mounted on shaft 59 are gears 60, one for each register order. The gears 60 are selectively clutched to shaft 59 under control of entry magnets EM, one for each order. The entry magnets are adapted to be energized at differential times or points of the machine cycle (see Fig. 6). When an entry magnet is energized, it causes the related gear 60 to be picked up by shaft 59 and set in rotation after the usual mechanical lag which is just short of a cycle point. The gear 60 then rotates until it is mechanically declutched in a known manner before the "11" cycle point. Bearing in mind the mechanical lag, the gear 60 thus rotates through a number of steps equivalent to the number of cycle points between the point at which the entry magnet was energized and the "0" point. Thus, if a magnet EM is energized at the "2" cycle point, the related gear 60 rotates through two steps, entering the value 2 in the register order. Each order comprises an indicator wheel 61 to which is fast a gear 62 meshed with gear 60 of the order. The indicator wheels of a section are rotatably mounted on a common shaft 63. Each order further comprises a readout commutator AR of which the rotor 64 is rigidly connected to a gear 65 meshed with gear 60 of the order. The rotor 64 has two diametrically opposite brushes 66, one of which wipes a common segment 67 as the other is wiping individual digit segments 68, marked 0 to 9. The gear ratios are such that the rotor makes one-half a revolution for each rotation of the associated indicator wheel 62. When the indicator wheel registers a particular digit, one of the brushes 66 is engaged with the segment 68 corresponding to the registered digit. Reset means such as disclosed in Patent No. 2,097,145 are provided to reset the accumulators to zero. Briefly, the reset means comprises Geneva gearing 70 (Fig. 3) between shaft 53 and a reset shaft 71. Shaft 71 has one-revolution reset clutches 72, one for each entry receiving section. The driven elements of these clutches are geared through gears 73 to the shafts 63 which rotatably mount the indicator wheels 62. For each clutch 72, a reset clutch magnet RM is provided which, when energized, causes the reset clutch to become effective to rotate shaft 63 for one revolution. During this revolution, the shaft 63 picks up the indicator wheels 61 mounted thereon and returns them to zero positions. As the indicator wheels are reset, the associated readout commutators AR are also reset to zero positions.

The driven clutch element of each clutch 72 has a cam 75 for operating a lever 76 to temporarily close normally open Rb contacts and open normally closed Ra contacts. The contacts Ra and Rb and magnets RM, as well as other commonly identified corresponding elements of the different sections may be preceded in the circuit diagram by the section number of the section to which they belong. For example, 1RM identifies a magnet RM as being in section #1.

Shaft 53, through a gear 54 and gearing 77 effects half a revolution of a shaft 78 each cycle. On shaft 78 are the brush carriers of ordinary emitters EM1, 2, and 3. Each emitter has two brushes 79, one of which wipes the individual emitter segments during each cycle while the opposite brush is on the common segment.

Driven one-to-one by shaft 53 is a shaft 80 on which are cams CC' for operating CC cam contacts shown in the circuit diagram. Also on shaft 80 are circuit breakers CB1 and 2.

Figure 5:
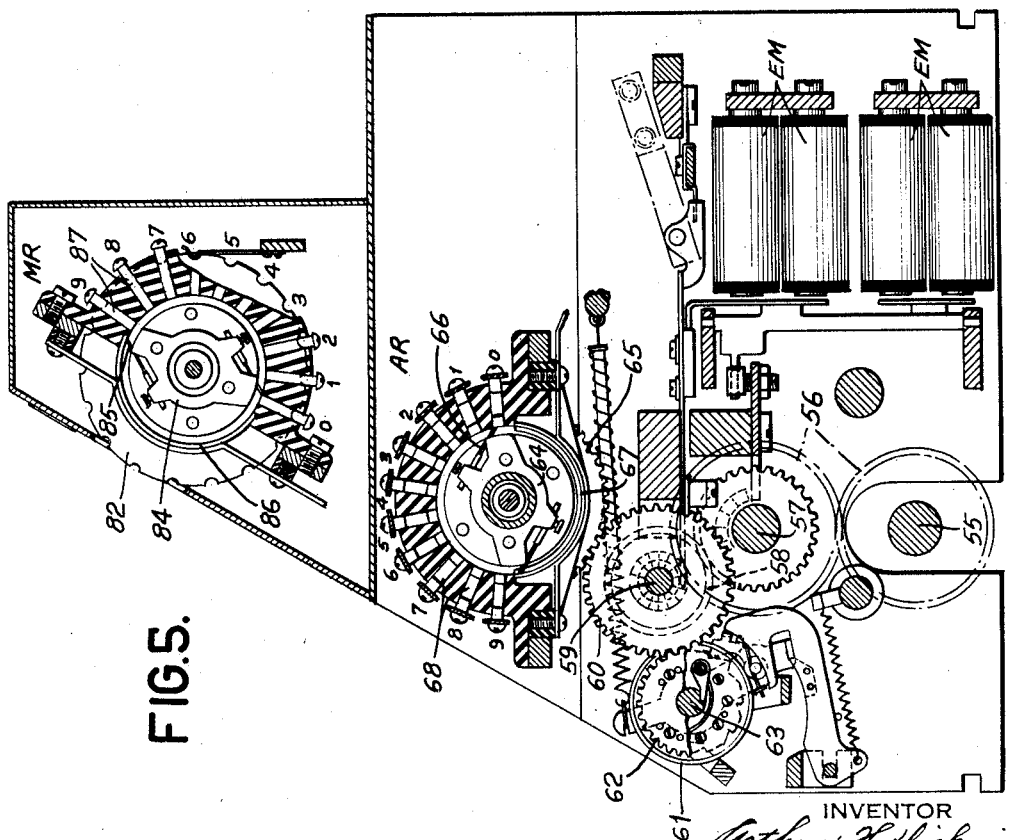
Fig. 5 is a section through the limit representing means showing both the manual and automatic limit representing means.

Instead of automatically setting up limit ranges derived from cards, the limit ranges may be manually determined by setting manual commutators MR (see Figs. 3 and 5). The manual commutators are arranged similarly to the automatic commutators in the three sections. Thus, each section has a left and right hand group of three denominationally related orders of commutators MR to be set, respectively, to lower and upper limits. Each commutator MR comprises a notched wheel 82 protruding through the casing to enable the wheel to be rotated by hand. Each wheel 82 is also suitably inscribed with digits to indicate opposite a suitable index the value for which the related commutator order is set. Carried by the wheel 82 is a rotor 84 provided with brushes 85 one of which is on common segment 86 while the other is on one of the individual value segments 87. The control of limit sorting by the manual commutators will be explained later in connection with the circuits.

Circuits and operations

The mechanical structure having been explained, the operations will be described with particular reference to the circuits, Figs. 8a, b, and c. In Fig. 8a, the commutator designated SC is the usual sorting commutator the rotor of which is mounted on one of the cyclical shafts, preferably shaft 26 of contact roll 25 of analyzing station B (see Fig. 1). The individual segments 95 of this commutator correspond to different index positions as denoted in Fig. 8a and successively engage brush 96 during a cycle, the succession beginning with segment 9. Also, as indicated in Fig. 8a, the sensing brushes AS are wired to plug sockets 100 which may be referred to as the A station plug sockets. Similarly, the sensing brushes BS are wired to plug sockets 101 which may be referred to as the B station plug sockets.

While the machine is specially devised to perform sorting according to different limit areas, it is, in addition, capable of effecting the regular sorting operation which involves sorting cards to the different pockets according to the perforations in a selected card column. Regular sorting will be explained first.

*Regular sorting.*—Referring to Fig. 8a, a plug wire (not shown) is plugged to a socket 103 and to the B station socket 101 of the column which is to control sorting. Switches S1 and S2 (Fig. 8a) are moved to dotted line positions. A stack of cards C having been placed in the supply hopper, the operator closes main switch S (Fig. 8b, upper right corner), connecting the opposite current lines 104 and 105 to the supply line. As soon as this is done, the clutch magnets PCM and FCM are energized as follows (Fig. 8b):

*PCM circuit.*—Line 104, magnet PCM, a coil PCM' in parallel with PCM, relay contacts R1a, R2a, R3a R4a, R5a and R6a, to line 105.

*FCM circuit.*—Line 104, magnet FCM, relay contacts R2b and R3b, to line 105.

Energization of these clutch magnets (also see Fig. 2) enables the picker, feed rolls, and contact rolls in advance of the sorting blades 28 to be operated when motor M is set in operation.

The operator now depresses the start key, closing start key contacts K to complete a circuit as follows (Fig. 8b, upper right):

*Start circuit.*—Line 104, stop key contacts K', start key contacts K, relay coils R7 and R8, to line 105.

Coil R8 closes its a contacts to complete a circuit through motor M. Now, with the magnets PCM and FCM energized and motor M running, the pickers and feed rolls 17, 21, and 23 will be set in operation. The bottom card feeds out of the hopper 10 (Fig. 1) to feed rolls 17. Near the end of the first machine cycle, the first card closes card lever contacts CL1' and opens card lever contacts CL2'. Closing of contacts CL1' completes a circuit through a coil R9 while opening of contacts CL2' breaks a circuit through a coil R10. Coil R9 closes its contacts R9a, closing a shunt circuit around start key contacts K, the shunt circuit extending through contacts K', R9a, R7a, and coils R7 and R8. The operator may now release the start key without interrupting the motor circuit. The machine goes through a second cycle during which the first card is advanced by feed rolls 17, 21, and 23 through analyzing station A and keeps card lever contacts CL1' closed and card lever contacts CL2' open. Before the first card releases card levers CL1 and CL2, the second card acts on these levers to maintain contacts CL1' closed and contacts CL2' open. As long as cards are at station A or feeding through this station, contacts CL1' remain closed and associated coil R9 remains energized to close contacts R9a and maintain the shunt circuit of coils R7 and R8 in effect. Near the end of the second cycle, the first card causes card lever contacts CL3' to close, energizing the relay coil R11 (Fig. 8b, right). The successive cards keep contacts CL1' and CL3' closed and their coils R9 and R11 remain energized as long as cards are feeding. Coil R11 closes relay contacts R11a, in parallel with contacts R9a and serving in the same way to complete a shunt circuit around the start key contacts. The latter shunt circuit will maintain coils R7 and R8 energized until the last card passes analyzing station B or until stop key contacts K' are opened. The function of coil PCM' in the PCM circuit will be explained subsequently.

The cards are now sorted in accordance with the sensing of perforations in the selected card column by the related brush BS and contact roll 25. The perforations 9, 8 . . . 11, and 12 of a card column pass the related sensing brush in the stated order at differential times of the cycle denoted in Fig. 6 as the 9, 8 . . . 11, and 12 cycle points. The differential time of energization of the sorting magnet SM depends on the value of the sensed perforation and this in turn determines the selection of the correspondingly identified pocket 30 for receiving the card. Assuming, for example, that a card has in the selected column a "4" perforation, then at the "4" cycle time, the following circuit forms (Fig. 8a):

*Regular sorting SM circuit.*—Line 104, magnet SM, switch S2 in dotted position, the common contact ring of sorting commutator SC, the "4" segment 95, the brush 96, line 106, switch S1 in dotted position, relay contacts R11b, common brush Bc, contact roll 25 of station B, the selected brush BS and socket 101, the plug wire (not shown) to the socket 103, relay coil R12, and wire 107, to current line 105.

Coil R12 closes its a contacts, shunting out the analyzing station B and causing the sorting circuit to break under control of commutator SC, thereby taking the arc off the brush BS and roll 25 of station B.

As sorting magnet SM has been energized at the "4" cycle point, it selects the "4" pocket 30 to receive the analyzed card.

Sorting within limit ranges

The invention provides for sorting of a stack of cards to different pockets 30 according to which of different limit ranges embraces the values in a selected card field. By a limit range is meant all the values lying between and including a lower limit and an upper limit. The limits may be selected manually or automatically. The automatic selection is effected by entering limit values from limit control cards into the automatic commutators AR (Fig. 5). The manual selection is effected by setting the manual commutators MR. In either case, the three left hand commutators of a section are set to the lower limit and the three right hand commutators of the same section to the upper limit. With three sections being provided, three limit ranges may be selected. The detail cards C (Fig. 7) to be sorted according to limits have a value field of one or more columns bearing the detail values which are sensed to determine whether they lie within one limit range or another. If the detail value of a card lies within one range, the card is sorted to one selected pocket; if the detail value is within another limit range, the card is sent to another pocket, if the detail value is within still another limit range, the card is sent to a third chosen pocket; and if the detail value is outside all the selected limit ranges, the card automatically is routed to the reject pocket. The detail value may be one, two, or three denominational order card columns. One, two, or three limit ranges may be selected. It is to be understood, however, that any other number of limit ranges and representing means therefor and any other number of denominational orders of limit and detail values may be used as required.

The lower half of Fig. 8b diagrammatically shows the sections of manual commutators MR and automatic commutators AR and the circuit connections thereto. Each section is associated with six limit readout coils, three for the lower limit and three for the upper limit of a limit range. The readout coils of each section are designated LH, LT, LU, SH, ST, and SU. The letter L indicates that a coil is controlled by a lower limit, the letter S that a coil is controlled by the superior or upper limit, and the letters H, T, and U denote hundreds, tens, and units orders. For example, coil LH of section #1 is the readout coil controlled by the lower limit value standing in the hundreds order of a left hand group of commutators in section #1. There is one limit coil for the corresponding orders of the automatic and manual readout commutators of each section. Whether the manual or automatic commutators are to control the limit readout coils depends on the setting of the handle S3 of a gang of commonly operated switches S3a—b (lower left, Fig. 8b). When the switch handle is in the full line position, switch sides a all are closed and connect the common segments 67 of commutators AR to the readout coils. When the switch handle is shifted to the dotted line position, all the sides b of the switches are closed, connecting the common segments 86 of commutators MR to the readout coils.

For sorting within limit ranges, the switches S1 and S2 (Fig. 8a) are set in full line positions. The pockets 30 to receive the cards whose detail values lie within different limit ranges are selected by running plug wires (not shown) between plug sockets 110 (Fig. 8a) and the plug sockets 111 marked with the numbers corresponding to the pockets which are to receive the cards. The card field from which the detail values are to be derived is selected by running plug wires (not shown) between station A sockets 100 and sockets 112. The chosen sockets 100 are the ones wired to the brushes AS for sensing the columns of the desired detail card field. There are three sockets 112, each wired to a pair of detail value readout coils for reading out one order or column of the detail value. These coils are designated EH, ET, EU and GH, GT, and GU, the letter E symbolizing equality of a detail value to a limit, upper or lower; the letter G denoting that a detail value is greater than a limit, upper or lower; and the letters H, T, and U denoting hundreds, tens and units orders. The socket 100 associated with the brush AS for sensing the units order of the chosen card field is connected to the socket 112 wired to the pair of coils EU and GU, and the sockets 100 of the brushes AS which are to sense the tens and hundreds order columns are connected to sockets 112 of the coils ET, GT, and EH, GH.

Assume that limits have already been set up in the sections #1, #2, and #3 and that detail cards C (Fig. 7) are feeding through analyzing station A. As a card C passes through station A, brushes AS sense the detail value represented in the selected card field. If, for example, the units order detail value is "5," represented by a perforation in the "5" index position of the units order column of the card field, then at the "5" cycle point the following circuit is completed (Fig. 8a):

*Detail value readout.*—Line 105, circuit breaker CB1, common brush Ac, contact roll 19, the brush AS sensing the units order column, the connected plug socket 100, the plug wire (not shown) to right hand socket 112, the coils EU and GU connected to this socket, the line 104.

Similar circuits are made at differential times during the cycle for energizing coils ET, GT, EH, and GH. The E coils are momentarily energized while the G coils are held energized through their stick contacts a and the cam contacts CC17 (see Fig. 6).

During the cycle in which the detail value of a card is being read out to energize the E and G coils, the limit values are being read out at differential times corresponding to the magnitudes of the values in order to energize the limit readout coils (bottom of Fig. 8b). For example, assume the manual commutators have been selected for control by closing switch sides S3b and that a lower limit value of 3 is in the units order of section #1. The following circuit forms at the 3 cycle time (Fig. 8b):

*Limit readout.*—Line 105, the common emitter EM1, the brushes 78 thereof, the "3" segment of the emitter, the common wire 114 of the "3" segments of all the readout commutators, the brush 85 engaging the "3" segment of the units order of the left hand group of commutators MR of section #1, common segment 86 of this commutator order, the b side of the connected S3 switch, the limit readout coil LU of section #1, to line 104.

If the automatic commutators were selected for limit control, the b sides of the switches S3 would be open and the a sides would be closed. If a "3" lower limit were set up in the units order commutator AR of section #1, a circuit would be established through coil LU of section #1 similar to the one just traced except that it would extend through the "3" segment 68, brush 66, common segment 67, of the commutator AR of the units order of section #1 and through the side a of the connected switch S3.

Through similar differentially timed limit readout circuits, the other limit readout coils of the sections #1, #2, and #3 will be energized during the same cycle in which the detail value of a card is read out to energize the E and G detail value readout coils (Fig. 8a) at differential times.

The detail value readout coils and limit readout coils operate various contacts for controlling circuits to determine which of the chosen pockets 30 is to receive the card or whether the card is to go to the reject pocket. Referring to Fig. 8c, there is an upper row of *a* relay contacts, one for each limit readout coil and adapted to be closed by energization by the related readout coil. A second row of *b* contacts is provided, there being one such *b* contact for each limit readout coil except the units order coils LU of the three sections. The contacts of the third row are commonly operated *b* contacts of detail value readout coil GH, those of the fourth row are the *b* contacts of coil GT, and those of the fifth row are the *b* contacts of coil GU. The contacts EH*a*, ET*a*, and EU*a* are commonly operated contacts of coils EH, ET, and EU.

The condition of these contacts determines which of the comparing coils arranged in a row near the bottom of Fig. 8c are energized. There are eleven comparing coils in each of sections #1, #2, and #3. Comparing coils whose reference designations have L as the first letter are the lower limit comparing coils; those coils whose reference designations have S as the first letter are the upper limit comparing coils. The second letter in the designation of the comparing coils is either E denoting equality of detail and limit values or G denoting that the limit value is greater than the detail value. The supplementary letters U, T, and H denote units, tens, and hundreds orders. As an example, coil LEH of a section is adapted to be energized when the lower limit of the hundreds order is equal to the detail value of the hundreds order card column of the selected card field. There is a pair of lower limit comparing coils LE and LG for each order except the units order for which only a coil LG is necessary. There is also a pair of SE and SG coils for each order including the units order. Several examples of the pick-up circuits for comparing coils will be traced below. When the lower limit in the hundreds order of a section is equal to the detail value in the hundreds order of the card field, limit readout coil LH of this section and detail value readout coils EH and GH are simultaneously energized. Coil GH is held through its stick circuit, as explained previously, while coils EH and LH are momentarily energized. Coil LH closes its *a* and *b* contacts (Fig. 8c), coil EH closes all its EH*a* contacts, while coil GH opens normally closed GH*b* contacts. The circuit for comparing coil LEH of the same section as the LH coil is then closed, as follows:

*LEH comparing coil.*—Line 104, the LH*b* contacts of the energized coil LH of a section, the EH*a* contacts in series with the LH*b* contacts, the coil LEH of the section, to line 105.

When the hundreds order lower limit of a section is higher than the detail value in the hundreds order, the lower limit readout coil LH is energized before the detail value readout coils EH and GH. Hence, upon closure of the *a* contacts of the energized limit readout coil LH, the following circuit forms:

*LGH comparing coil.*—Line 104, the LH*a* contacts of the energized coil LH of a section, the normally closed GH*b* contacts in series with the LH*a* contacts, the coil LGH of the section, to line 105.

The other comparing coils are energized through similar circuits except for the higher limit units order coils SEU of the sections. The circuit of the coil SEU includes a pair of D*a* relay contacts whose function will be explained later and which may be by-passed by closing a hand switch S4.

When any comparing coil is energized, it closes stick contacts designated *a* to form a holding circuit for the coil through cam contacts CC1 (see also Fig. 6) which do not open until after all the index positions of a card have passed analyzing station A.

At the bottom of Fig. 8c are three sorting selection coils 1A, 2A, and 3A, respectively in sections #1, #2, and #3. Selection coil 1A will be energized if the limits set up in section #1 embrace the detail value of a detail card traversing analyzing station A. The pickup circuit of a coil 1A extends through contacts 1B*a*. The holding circuit of coil 1A is formed through its stick contacts *a* and cam contacts CC3 (also see Fig. 6). Similarly, if the detail value is within the limits of section #2, coil 2A is picked up through contacts 2B*a* and held through its stick points and cam contacts CC3. Likewise, if the detail value is within the limit range defined by section #3, coil 3A is picked up through contacts 3B*a* and held through its stick contacts and contacts CC3. The pickup contacts 1B*a*, 2B*a*, and 3B*a* are closed by energization of their respective operating coils 1B, 2B, and 3B. Each B coil is wired to a plug socket 115. A plug wire (not shown) is connected between the socket 115 of a section and one of the three sockets 116H, T, and U of the section. The socket 116H is chosen when limits of three orders are used, socket 116T is chosen when limits of two orders are used, and socket 116U is chosen when limits of only a single order are used. The circuit of the B coil is thus routed through either of three paths, one including a normally closed LGH*b* contact and a normally open SGH*b* contact. Another path includes the *b* contacts of LGT and SGT, while the third path includes the *b* contacts of LGU and SGU. For example, if limits of three orders are used, the circuit of coil 1B extends from line 105 through the coil, the plug socket 115, the plug wire (not shown) to socket 116H, contacts SGH*b* (when closed), contacts LGH*b* (when remaining closed), cam contacts CC2, to line 104. The cam contacts CC2 close momentarily at the "13" cycle point which is after the last index position of a card has passed the analyzing station A. The period of closure of contacts CC2 is the test period to determine which of the B coils is to be energized, if any. The B coil closes its *a* contacts during the test period to pick up the associated A coil. The A coil is thus picked up when a detail value of a card is found to be within the limits of the section in which the A coil belongs. The test period in which the A coil is picked up occurs after the index positions of the card pass the sensing brushes AS during a cycle. The A coil is then held through its stick contacts *a* and cam contacts CC3 until the "12" point of the next cycle. During this next cycle, the card whose detail value has been compared is passing through station B and beneath the entrance ends of the sorting blades 28 (Fig. 1). Energization of the sorting magnet SM occurs during this cycle under control of contacts closed by the A coil which was energized during the preceding cycle. The time of energization of the sorting magnet depends on which of the pockets 30 has been chosen to receive cards whose detail values fall within the limits set up in the section to which the energized A coil belongs. Assume, for example, that pocket 30—2 is assigned to section

1, pocket 30—4 to section #2, and pocket 30—5 to section #3. For this allocation of pockets, the plug socket 110 wired to contacts 1Ab (Fig. 8a) is connected by a plug wire (not shown) to the socket 111—2; the socket 110 wired to contacts 2Ab is connected by another plug wire to socket 111—4; and the socket 110 wired to contacts 3Ab is connected by a third plug wire to socket 111—5. Assuming, for example, that the detail value of a card is within the limit range of section #1, the coil 1A will be energized during the cycle in which the card has been analyzed by station A and will remain energized during the following cycle, maintaining contacts 1Ab closed till the "12" point of the latter cycle. At the "2" point of the latter cycle, the following circuit will form (Fig. 8a):

*Limit sorting circuit.*—Line 105, relay contacts R6b, R5b, R4b, R1b, contacts 1Ab, connected socket 110, the plug wire (not shown) to socket 111—2, the "2" segment of emitter EM2, the brushes thereof, the common segment thereof, switch S2 in full line position, magnet SM, to line 104.

Magnet SM having been energized at the "2" time, the card will be directed to pocket 30—2.

If the detail value of the card had been within the limits of section #2, contacts 2Ab would have been closed and the magnet SM would have been energized at the "4" time to cause the card to go to pocket 30—4. Had the detail value been within the limit bounds of section #3, contacts 3Ab would have been closed and at the "5" time, magnet SM would have been energized, causing the card to be guided to pocket 30—5.

In above manner, the card will be directed to one of different destinations depending on which of different limit areas embraces the detail value represented in the selected card field.

Considering limits of three denominations, it has been explained that the B and A coils of the sections are energized through circuits including contacts LGHb and SGHb. If a detail value is outside the limit area of a section, either the LGHb contacts will be opened or the SGHb contacts will remain open to prevent energization of the B and A coils of this section. The LGHb contacts are opened if the detail value is less than the lower limit of the section while the contacts SGHb will remain open if the detail value is greater than the upper limit of the section. If the hundreds order of a detail value is less than the corresponding order of the lower limit of a section, coil LGH is energized, contacts LGHb are opened and the B and A coils of the section remain idle. If the hundreds order of the detail value and the same order of lower limit of a section are equal, and the tens order of the detail value is less than the tens order of the lower limit, the detail value as a whole is below the lower limit of the section and coil LGH must be energized to prevent coils A and B of the section from being energized. For this purpose, the coil LEH, when energized, closes LEHb contacts which in conjunction with the a contacts closed by the energized LGT coil provides a shunt circuit through coil LGH. This shunt circuit extends from line 105 through coil LGH, contacts LEHb, contacts LGTa, cam contacts CC1, to line 104. If the detail value and the lower limit of a section are equal in the hundreds and tens orders, and the units order of the detail value is less than the units order of the lower limit, the detail value also is outside the limit range of this section. Coil LGH must again be energized to prevent coils A and B of this section from being energized. For this purpose, the LET coil also closed LETb contacts which in conjunction with the LEHb contacts and the LGUa contacts provide a shunt circuit for coil LGH. If the detail value and the lower limit of a section are equal in all the orders, the detail value is necessarily below the higher limit of the section and coil LGH will remain unenergized, its contacts LGHb will stay closed and the SGHb contacts will be closed to cause the B and A coils of the section to be energized. The SGH coil of a section is always energized when the detail value is equal to or higher than the lower limit and less than the upper limit of a section. If the hundreds orders of the detail value and upper limit of a section are equal and the tens order of the detail value is less than the tens order of the upper limit, coil SHG is energized through a shunt path extending through contacts SEHb and SGTa. If the tens and hundreds orders of a detail value and the upper limit of a section are equal, and the units order of the detail value is less than the units order of the upper limit, coil SGH is energized through a shunt path including contacts SEHb, SETb, and SGUa. Provided the Da relay contacts are permitted to remain closed or are shunted by closing hand switch S4, the SEU coil of a section will be energized if, in the units order, the upper limit is equal to the detail value. Coil SEU will close its a contacts and with the tens and hundreds orders of upper limit and detail value also equal, coils SEH and SET will likewise be energized, closing their b contacts. Coil SGH will be energized through a shunt path including contacts SEHb, SETb, and SEUa. Coil LGH of the same section will not have been energized because the value equal to the upper limit is necessarily above the lower limit.

In the above manner when sorting according to three order limits and with contacts Da closed or shunted, coil SGH of a section will be energized if the detail value is equal to or less than the upper limit, and contacts SGHb will close to manifest this size relation of detail value to upper limit. Further, with the detail value equal to or higher than the lower limit of a section, coil LGH of the section will remain inactive and its contacts LGHb will remain closed to manifest this relation of detail value to lower limit. Thus, when contacts LGHb and SGHb of a section are both closed after the detail and limit values have been read out, the detail value is equal to or above the lower limit and equal to or less than the upper limit. This comparison result will be read out upon closure of cam contacts CC2 at "13" of the cycle in which the detail card from which the detail value was taken for comparison with the limits passes through station A, and coil B of the section will be energized. Coil B will close its a contacts and the related A coil will be energized and held through its a contacts and cam contacts CC3. Then during the next cycle, as the detail card is traversing station B, the limit sorting circuit will be formed through the b contacts of the energized A coil, and the card will be directed to the sorting pocket preselected for the section in which the energized A coil belongs.

It is believed clear that the detail value of the card passing through station A is compared concurrently with the limits of all three sections and since these sections are set to different limit ranges, the detail value may be found to be within only one range or none. To illustrate, assume the detail card passing during a cycle through analyzing station A has detail value 642 and the limits are:

Section #1—108 to 500
Section 2—641 to 780
Section 3—900 to 911

The comparison operations may be tabulated thus, the comparing coils being underlined:

| Cycle points | Coils | Pertinent contacts | Energization |
|---|---|---|---|
| 9 | 3LH | 3LHa and b | Momentary. |
| 9 | 3LGH | 3LHa and GHb | Held to "14." |
| 9 | 3SH | 3SHa and b | Momentary. |
| 9 | 3SGH | 3SHa and GHb | Held to "14." |
| 8 | 1LU | 1LUa | Momentary. |
| 8 | 1LGU | 1LUa and GUb | Held to "14." |
| 8 | 2ST | 2STa and b | Momentary. |
| 8 | 2SGT | 2STa and GTb | Held to "14." |
| 7 | 2SH | 2SHa and b | Momentary. |
| 7 | 2SGH | 2SHa and GHb | Held to "14." |
| 6 | GH | GHa and b | Held to "12." |
| 6 | EH | EHa | Momentary. |
| 6 | 2LH | 2LHa and b | Do. |
| 6 | 2LEH | 2LHb and EHa | Held to "14." |
| 5 | 1SH | 1SHa and b | Momentary. |
| 4 | GT | GTa and b | Held to "12." |
| 4 | ET | ETa | Momentary. |
| 4 | 2LT | 2LTa and b | Do. |
| 4 | 2LET | 2LTb and ETa | Held to "14." |
| 2 | GU | GUa and b | Held to "12." |
| 2 | EU | EUa | Momentary. |

At the "1" point, 1LH, 2LU, 3ST, and 3SU are energized but are ineffective as the coils GH, GT, and GU all have previously been energized. For the same reason, energization of coils 1LT, 1ST, 1SU, 2SU, 3LT and 3LU at the "0" point is ineffective.

The above tabulated comparison has energized comparison coils in the sections as follows:

| Section | Lower limit | Upper limit |
|---|---|---|
| 1 |  | LGU |
| 2 | LEH, LET | SGH, SGT |
| 3 | LGH | SGH |

In section 1, the LGHb contacts remain closed and the SGHb contacts do not close, hence the B and A coils of this section will not be energized. In section 2, the LEHb and LETb contacts have closed. Since the units order detail value "2" is higher than the units order lower limit "1" of section #2, the contacts GUb will be open at the time contacts 2LUa close. If the units order lower limit of section #2 had been "3" contacts GUb still would have been closed when contacts 2LUa closed and a circuit of coil 2LGH would have been made through 2LUa, GUb, 2LETb, 2LEHb, through coil 2LGH. Coil LGH would have opened contacts 2LGHb to prevent sorting of the card to the pocket selected for section #2. However, for the example being considered and tabulated the contacts 2LUa close while contacts GUb are open and the previous closure of 2LEHb and 2LETb has no effect and coil 2LGH remains inactive and contacts 2LGHb remain closed. Coil 2SGH also has been energized and contacts 2SGHb are closed. In section #3, coils LGH and SGH are energized; hence, contacts LGHb are open and SGHb closed. Only in section #2 are contacts LGHb and SGHb closed. Hence at "13" of the cycle, when contacts CC2 close, coil 2B is energized and closes contacts 2Ba to pick up coil 2A. Coil 2A closes contacts 2Aa to hold the coil energized through CC3 until "12" of the next cycle. Coil 2A closes contacts 2Ab (Fig. 8a) and during the cycle following the comparison, when the card whose detail value is 642 passes through analyzer B, sorting magnet SM is energized at the preselected cycle point to cause the card to be directed to the pocket assigned to section #2 whose limits 641 to 780 contain the detail value.

If limits of two orders are used, plug sockets 115 are connected to sockets 116T. Coil LGT of a section will be energized when, in the tens order, the lower limit of the section is above the detail value. Contacts LGTb will open, preventing energization of coils A and B of the section. If in the tens orders, the lower limit of a section and the detail value are equal while in the units order the lower limit is above the detail value, coils LGU and LET of the section will be energized. The coil LGT will then be energized through a path including contacts LGUa and LETb. If, in both orders, the detail and lower limit values are equal, coil LGT will not be energized. Such a detail value is necessarily below the upper limit of the section and coil SGT will be energized to close contacts SGTb. The contacts LGTb having remained closed, the A and B coils of the section will be energized and the card will subsequently be directed to the pocket preselected for the section. The coil SGT of a section will be energized if, in the tens orders, the detail value is less than the upper limit of the section. Coil SGT also will be energized if, in the tens orders, the detail value and upper limit are equal while, in the units orders, the upper limit is above the detail value. The circuit of coil SGT will then be made through contacts SGUa and SETb. Provided the contacts Da are closed or shunted, coil SGT also will be energized if, in both tens and units orders, the detail and upper limit values are equal. Comparison of the equal detail and upper limit values will cause coils SET and SEU to be energized. The circuit of coil SGT will then be made through a path including contacts SETb and SEUa. Such a detail value is necessarily above the lower limit and coil LGT will not be energized. Contacts SGTb and LGTb of the section will be closed and coils A and B energized. Hence, the card will subsequently be directed to the pocket selected for this section.

Similarly, if the limits are single denominational order values, a coil LGU of a section will be energized if the detail value of the one order is less than the lower limit of the section and a coil SGU will be energized if the detail value is less than the upper limit. Coil SGU will also be energized, provided related contacts Da have not been opened in a manner explained later, if the detail value is equal to the upper limit. With socket 115 plugged to socket 116U, the condition of contacts SGUb and LGUb will determine which of coils A and B are to be energized, if any. If the single order detail value is equal to the single order upper limit of a section and the contacts Da of the section are permitted to remain closed or if they are bypassed by closing switch S4, the coil SGU will be energized simultaneously with the coil SEU, the two coils being connected in parallel by wire 117. Hence, with contacts Da closed or shunted, cards whose detail values equal the single order upper limit of a section will pass to the pocket assigned to the section.

In all cases, coils SEU and SGU are connected to wire 117 in parallel so that coil SEU will be energized whenever coil SGU is energized. Coil SEU, however, will have no controlling effect as the coil SGU will predominate and effect the requisite control.

In the above manner, the comparison of the detail value of a card with the limits of the three sections will result ultimately in the energization of the A coil of the section whose limit range contains the detail value of the card. The energized one of the coils 1A, 2A, or 3A will close its b contacts (Fig. 8a) to cause sorting of the card to the pocket preselected for the section whose A coil has been energized. None of the A coils of the three sections is energized if the card does not have a detail value lying within any of the limit ranges. In that case, neither the 1Ab, 2Ab, or 3Ab contacts are closed and magnet SM is not energized, causing the card to go to the reject pocket.

When the three sections have been set to certain limits and it is desired, without changing the setting, to sort cards within a limit area whose lower limit is the lower limit of section #1 and whose upper limit is the upper limit of section #2, the operator will connect the plug wires from sockets 110 (Fig. 8a) wired to the contacts 1Ab and 2Ab to the double plug sockets 111 associated with a single desired pocket 30. Energization of either coil 1A or 2A will cause the card to be directed to the same selected pocket. Similarly, the plug sockets 110 of contacts 2Ab and 3Ab will be connected to the same socket 111 when it is desired to send cards within the limits of sections #2 and #3 to the same pocket.

*Adjoining limit ranges.*—If the upper limit of one range is the same as the lower limit of the next higher range, these two ranges may be considered to be adjoining limit ranges. As an example, three adjoining limit ranges are 123–215, 215–254, and 254–500. If cards are to be sorted according to adjoining limit ranges, it is frequently desirable to cause a card having a detail value equal to a common limit of two adjoining ranges to be sorted to the pocket allotted to the higher limit area. For this purpose, the switches S4 are opened and means are provided to open contacts Da. With contacts Da open, if the detail value is equal to the upper limit of section #1, coil SEU of this section will not be energized, and neither the coil SGH, SGT, or SGU will be energized. Consequently, the A and B coils of section #1 will be inactive. Such a detail value will be equal to the lower limit of section #2 and consequently none of coils LGH, LGT, or LGU of section #2 will be energized, permitting their b contacts to remain closed. The detail value will necessarily be less than the upper limit of section #2 and, consequently, one of the coils SGH, SGT, or SGU will be energized, depending on the number of orders in the limits, and the coils A and B of section #2 will be energized. Coil A will then cause the card to be directed to the pocket allocated to section #2. Similarly, a card having a detail value equal to the upper limit of section #2 and the coincident lower limit of section #3 will be directed to the pocket assigned to section #3. If the card has a detail value equal to the upper limit of section #3, the SGH, SGT, and SGU coils of this section will remain deenergized, none of the A and B coils will be energized, and the card will go to the reject pocket. If, instead, it is desired to direct a card with a detail value equal to the upper limit of section #3 to the pocket assigned to this section, the switch S4 of this section is closed to shunt out contacts Da. Similarly, when sorting to adjoining limits of only sections #1 and #2, the switch S4 of section #2 will be closed if it is desired to sort cards having detail values equal to the upper limit of section #2 to the associated pocket instead of to the reject pocket.

When sorting according to adjoining limits, it is unnecessary to set the lower limit of higher range of two limit ranges. For example, considering sections #1 and #2, the lower limit commutators of section #2 need not be set since they will exercise no control over the limit readout coils, as will be brought out now. Reference to Fig. 8b indicates that coils LH, LT, and LU of sections #2 and #3 are connected to the left hand group of commutators of these sections through the normally closed sides of switches Db. When the central blades of these switches are shifted, the normally closed sides open, thereby disconnecting the lower limit readout coils of sections #2 and #3 from the lower limit commutators of these sections. As the left, normally open sides of switches Db close, the lower limit readout coils of sections #2 and #3 are connected to the upper limit commutators of the preceding sections. Thus, the coils LH, LT, and LU of section #2 are connected to the right upper limit commutators of section #1 and the lower limit coils of section #3 are connected to the upper limit commutators of section #2. In this manner, when sorting according to adjoining limit ranges, the settings, of the left hand commutators of sections #2 and #3 are ignored and the lower limit coils of these sections are controlled by the upper limit commutators of the preceding sections.

To adjust the machine manually for adjoining limit sorting, the operator depresses a key DK (Fig. 8a) to close DK' contacts, energizing relay coils D. A coil D then closes contacts Dc to hold the circuit of these coils through normally closed reset contacts 1Ra, 2Ra, 3Ra, and release key contacts DR' of a key DR. Coils D open contacts Da of Fig. 8c and shift the switches Db of Fig. 8b for the purposes explained above. Adjoining limit range sorting may be terminated by depressing key DR to open contacts DR'.

The manner in which sorting of detail cards is controlled according to limit ranges defined by commutators MR or AR has been explained. It has also been pointed out that the commutators MR are settable by hand, and are placed in control by shifting the gang of switch contacts S3 (Fig. 8b) to positions in which their sides b are closed. It should be noted that when sorting is to be controlled by commutators MR, the machine is started in the same way and the feed means including clutch magnets PCM and FCM perform in the same way as for ordinary sorting. When it is desired to control sorting by the automatically settable commutators AR, the switches S3 are conditioned as shown in Fig. 8b, with their a sides closed. The commutators AR are set under control of limit cards.

Figure 7:
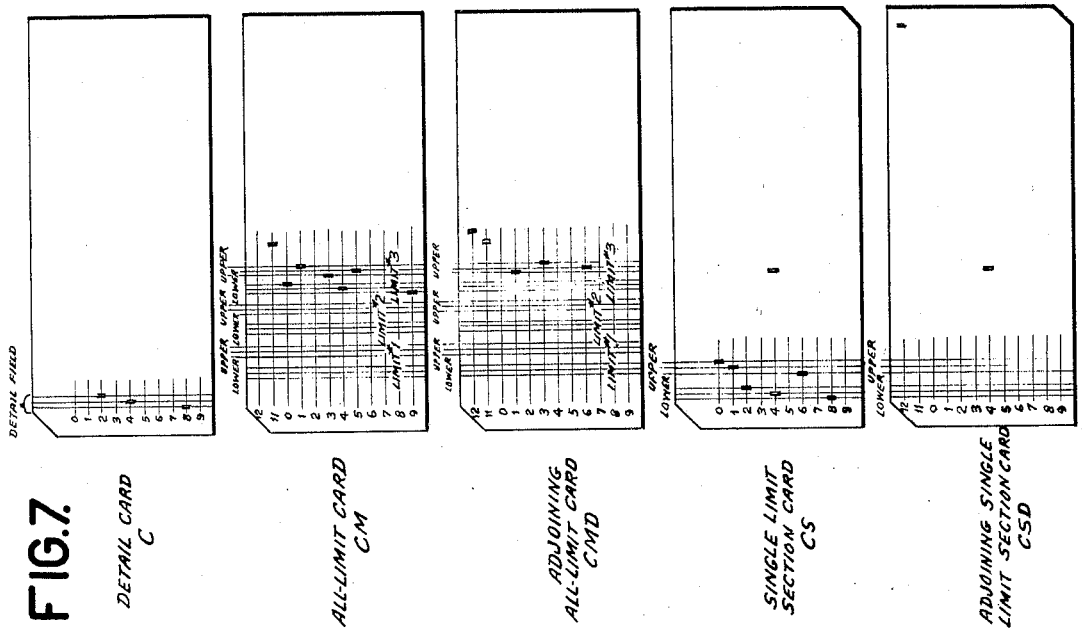
Fig. 7 shows the various record cards which the machine handles.

*Limit cards.*—Several different types of limit cards are shown in Fig. 7 which also shows a detail card C. The limit card CM has all the limits, upper and lower, for each section punched therein and a supplemental identifying perforation in the "11" position of a suitable column. Another type of limit card CMD includes the upper and lower limits of section #1 and the upper limits of sections #2 and #3. Card CMD also has an "11" hole and, in addition, a "12" hole to cause automatic operation of the D relay coils (Fig. 8a) for automatically conditioning the machine for sorting according to adjoining limit ranges. A third limit card CS bears the upper and lower limits for only one section and has a class selection perforation, "4" for example, in a suitable column. The limit card CS for each different section has a different class selection perforation. As will be described later, the different class selection perforations associate cards CS with different sections #1, #2, and #3. The card CS also has its lower right hand corner cut off to control reset of the associated section of commutators AR and entry of the limits represented on this card into this section. A fourth type of limit card CSD has a section-selecting perforation, just as a card CS and, in addition, a perforation in the "12" position of a suitable column to cause automatic conditioning of the machine for sorting within adjoining limit ranges. The card CSD for section #1 has upper and lower limits while the cards for the other sections have only upper limits. The switches S4 are left open for sorting under control of card-derived limits, thereby enabling cards CMD and CSD to exercise control over sorting within adjoining limits.

A limit card or cards precedes one or more detail cards to be sorted within the automatically selected limits. A plurality of groups of cards may be contained in a single stack, each group including its leading limit card or cards followed by a detail card or cards. The control by cards CM will be explained first.

*Derivation of limits from cards CM.*—As stated before, a card CM (Fig. 7) bears all the limits of the different sections of commutators AR to be set up for controlling sorting, and also bears an "11" hole. To prepare the machine for operation under control of limit cards CM, the operator runs a plug wire (not shown) between a socket 125 (Fig. 8a, lower right) and the A station socket 100 wired to the brush AS which is adapted to sense the card column in which the X perforation appears in cards CM. Plug wires (not shown) are plugged between sockets 101 associated with the card fields bearing limits and sockets 126 (Fig. 8a), wired through certain relay contacts to entry magnets EM of the different orders of entry receiving devices (see also Fig. 5). The sockets 112 of the detail readout coils GH, GT, and GU are also connected by plugwires to the A station sockets 100 corresponding to the card field bearing the detail values. Switches S1 and S2 are set in full line positions (Fig. 8a). Further, switch S3 is set in the full line position shown at the bottom of Fig. 8b, in which the a sides are closed. As stated before, switches S4 (Fig. 8c) are opened.

The operator now sets the machine in operation in the same manner as for ordinary sorting. Briefly, the main switch S (Fig. 8b, upper right) is closed, placing power on opposite lines 104 and 105, causing clutch magnets PCM and FCM to be energized (also see Fig. 2). The start key is depressed, energizing coils R7 and R8 (upper right, Fig. 8b). Coil R8 closes its a contacts, starting motor M operating. Assuming the first card of the stack to be a limit card CM, this card will now feed out of hopper 10 (Fig. 1) to feed rolls 17 and during the first cycle (see Fig. 6) will close card lever contacts CL1' and open contacts CL2'. Card lever relay coil R9 is thereby energized, while card lever relay coil R10 is deenergized. During the second cycle, the first card CM goes through analyzing station A and until near the close of the cycle holds contacts CL1' closed and contacts CL2' open. Meanwhile the second card, a detail card, is moving out of the hopper and before the end of the second cycle engages card lever CL1 to keep contacts CL2' open and contacts CL1' closed. Near the end of the second cycle, card CM closes card lever contacts CL3', energizing coil R11.

During the second cycle, a brush AS senses the X or 11 hole in the limit card, causing the following circuit to close (Fig. 8a):

*X hole circuit.*—Line 105, circuit breaker CB1, brush Ac, contact roll 19, the brush AS sensing the column containing the X hole, the connected socket 100, the plugwire (not shown) to socket 125, card lever relay contacts R9b, cam contacts CC8 (see Fig. 6), relay magnet R2, to line 104.

Magnet R2 closes its stick contacts R2c to provide a holding circuit for coil R2 extending through cam contacts CC4. These cam contacts remain closed until shortly before the "11" point of the following cycle.

Figure 6:
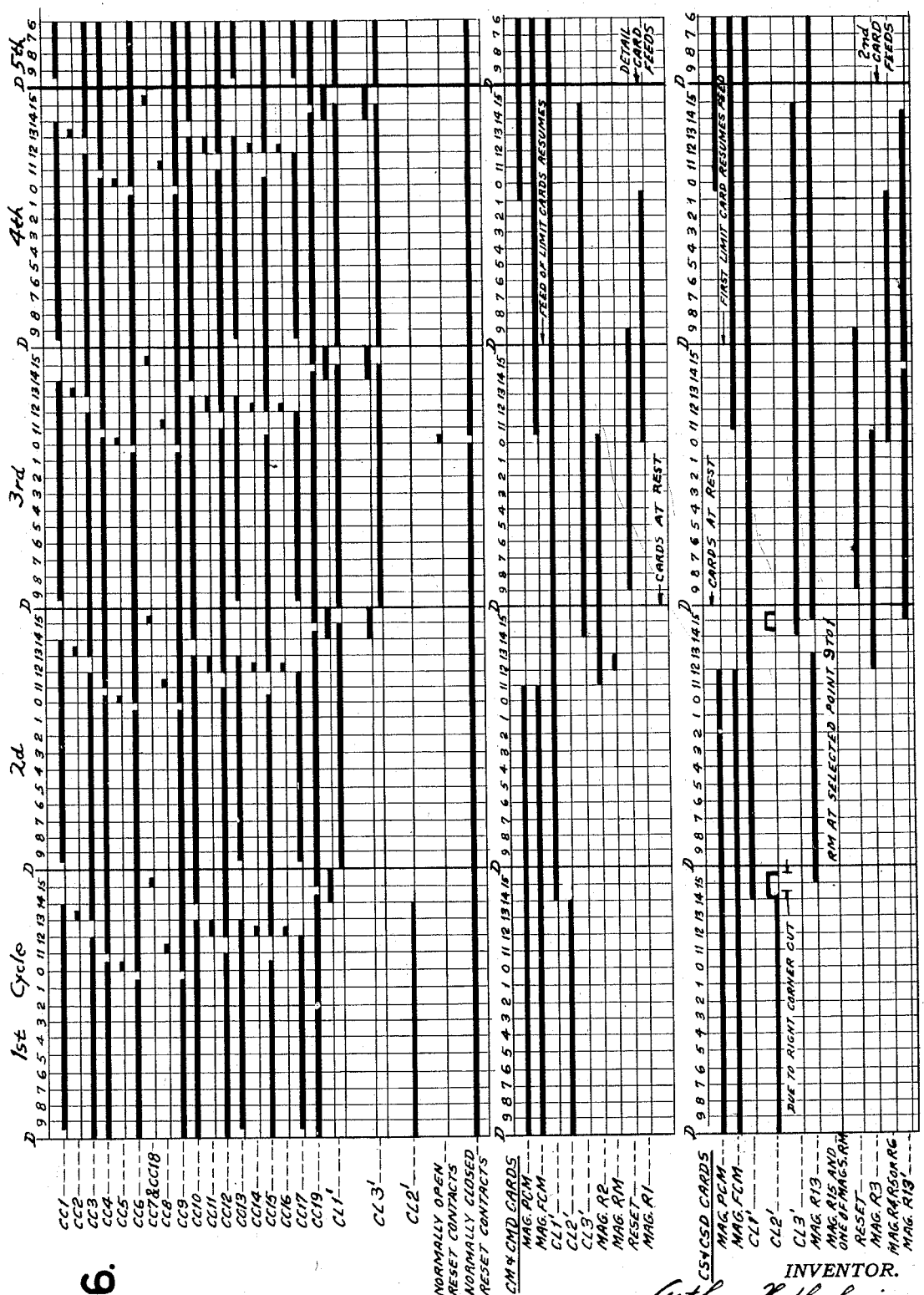
Fig. 6 is a timing chart.

Magnet R2 opens contacts R2a and R2b (Fig. 8b), breaking the circuits of clutch magnets PCM and FCM. Consequently, at the end of the second cycle, the card feed is interrupted. At this point, the leading end of the first card CM is just in advance of brushes BS and is holding card lever contacts CL3' closed, while the second card is similarly positioned with respect to brushes AS and is holding contacts CL2' open and contacts CL1' closed. While the cards are thus at rest at the end of the second cycle, the commutators AR are all reset. To effect this purpose, coil R2 closes contacts R2d, e, and f (Fig. 8b, upper left) and when cam contacts CC11 (Fig. 6) close at the "12" point of the second cycle, the reset magnets 1RM, 2RM and 3RM are energized. Energization of these magnets causes commutators AR of sections #1, #2, and #3 (also see Fig. 3) to be reset in the manner explained before. The reset begins shortly after "9" of the third cycle and terminates one cycle later, as indicated in Fig. 6. During resetting in the third machine cycle, the card feed is idle, clutch magnets PCM and FCM having been deenergized to cause card feed to be interrupted at the end of the second cycle. During the third cycle, in which reset is taking place, cam contacts CC5 (Fig. 8a, lower right) close, and as contacts R2g are now closed, a circuit is completed through magnet R1. Contacts R1c close, forming a stick circuit for magnet R1 extending through cam contacts CC6 which maintains this magnet energized until about midway between points 1 and 0 of the fourth cycle. Magnet R2 is deenergized during the third cycle when cam contacts CC4 open and contacts R2a and R2b, respectively in the circuits of PCM and FCM clutch magnets, reclose. As magnet R1 is still energized, contacts R1a are open, still preventing energization of clutch magnet PCM, so that the second card which is just in advance of brushes AS will not be fed through analyzing station A during the fourth cycle. The circuit of clutch magnet FCM, however, has been reestablished and, hence, the feed rolls 23 and contact roll 25 are set in operation at the beginning of the fourth cycle. Accordingly, card CM is advanced through analyzing station B during the fourth cycle. During the cycle interval between "9" and half-way through "1" positions sensing period of the fourth cycle, magnet R1 remains energized and closes a gang of contacts R1d (Fig. 8a) to condition the entry magnets EM for energization under control of the B station brushes BS. As the brushes BS sense the limit values in card CM, they close circuits through entry magnets EM at differential times corresponding to these values. A typical entry circuit, assuming a limit value of "6," is formed at the "6" time as follows (Fig. 8a):

*Entry circuit.*—Line 105, circuit breaker CB2, switch S1, card lever relay contacts R11b, brush Bc, the contact roll 25, the brush BS sensing the perforation "6," its socket 101, the plug wire (not shown) to a socket 126, the connected pair of R1d contacts, the normally closed side of a pair of contacts R4c (for section #1) or R5c (for section #2), or R6c (for section #3), the connected entry magnet EM, to line 104.

Energization of magnet EM at the "6" time is effective to enter "6" in the associated order of commutator AR.

During the period between "9" and past "1" of the fourth cycle, magnet R1 is energized; hence contacts R1b (Fig. 8a, center right) are open, preventing any circuit being completed during this period through sorting magnet SM. Accordingly, the limit card CM will be routed to the reject pocket. Since contacts R1b reclose after the "1" cycle point, the "0" and "11" sorting pockets are not used when sorting within limits derived from limit cards, as, otherwise, there would be a possibility that a limit card would be sorted to the "0" or "11" pocket instead of to the reject pocket as desired.

Magnet R1 is deenergized when cam contacts CC6 open after the entry period of the fourth cycle. Hence, contacts R1d reopen, preventing entries being made from the following detail cards into automatic commutators AR; contacts R1b reclose, preparing the pocket selecting circuit through contacts 1Ab, 2Ab, or 3Ab for closure under control of the means for ascertaining whether a detail value of the cards is within one of the limit areas defined by commutators AR. Also, contacts R1a reclose, completing the circuit of clutch magnet PCM. The picker and card feed now resumes operation, feeding the first detail card through station A and continuing to feed successive detail cards C from the hopper 10 through analyzing station A. The detail values are read out of the detail cards and measured against the limit ranges defined by the sections of commutators AR. The detail cards are sorted according to which of the limit ranges contains the detail values.

A group of detail cards may be followed by a new limit card CM leading another group of detail cards. While the new limit card is passing through analyzing station A, the last detail card of the preceding group is moving through analyzing station B and into the guide passage formed between a pair of sorting blades 28 (Fig. 1). The destination and guide passage for this latter detail card was selected during the preceding cycle and the card continues to its selected destination during the operations controlled by the new limit card. The sensing of the X hole in the new limit card sets the previously described train of operations into effect.

*Limits derived from cards CMD.*—A limit card CMD (Fig. 7) bears the upper and lower limits of section #1 and the upper limits of sections #2 and #3. Card CMD also has an X hole and a perforation in the "12" position of a suitable column. The machine is prepared for operation in the same manner as described for the derivation of limits from cards CM. In addition, a plug wire (not shown) is connected between the B station socket 101 (Fig. 8a) wired to the brush BS for sensing the column containing the "12" perforation to a socket 130 (lower right, Fig. 8a). It may be stated now that this plug connection will also be made when cards CM and CMD are in the same stack and appear in a single run. There is no interference between the controls exercised by these two kinds of limit cards, the card CMD merely exercising an additional control. The resetting of commutators AR is effected under control of the X hole in card CMD and the limits are entered from this card into commutators AR in the same way as described for cards CM. In addition, after the entry period of the cycle during which the card CMD is passing through station B, the "12" perforation in the card is sensed by the brush BS corresponding to the column containing the "12" perforation, closing the following circuit (Fig. 8a):

*Automatic D coils circuit.*—Line 104, coils D, cam contacts CC14, card lever relay contacts R9c, socket 130, the plug wire (not shown) to the socket 101 wired to the brush BS sensing the "12" perforation, the brush BS, the contact roll 25, brush Bc, card lever relay contacts R11b, switch S1, circuit breaker CB2, to line 105.

A coil D closes contacts Dc to form a stick circuit for the D coils extending through reset contacts 1Ra, 2Ra, 3Ra and release key contacts DR'. Coils D open contacts Da in the comparing circuits (Fig. 8c) and close contacts Db in the limit readout circuits (Fig. 8b). The machine is thereby conditioned for sorting the detail cards according to the adjoining limit ranges in the manner explained before.

When the next limit card CM or CMD passes through analyzing station A, the X hole circuit is established and reset magnets 1RM, 2RM, and 3RM are energized, causing reset of commutators AR. During reset, contacts 1Ra, 2Ra, and 3Ra open, breaking the stick circuit of coils D. The new limits are then entered into the commutators AR for controlling sorting of the following group of detail cards.

*Derivation of limits from cards CS.*—A card CS (Fig. 7) bears the limits for one section, has a perforation in a suitable column for selecting the section to receive the limits from the card, and has its lower right hand corner cut off to control reset and entry initiation. One or more limit cards CS may precede a detail card group. If only one card CS precedes a detail group, only the section selected thereby will be reset and receive new limits while the other sections will retain their previously entered limits. Two limit cards CS precede a detail group if two sections are to receive new limits. Three limit cards CS precede a detail group if three sections are to receive new limits.

For operation under control of cards CS, plug wires (not shown) are connected between B station sockets 101 (Fig. 8a) associated with the card columns which contain the limit amounts and plug sockets 132. A switch S5, shown at the lower right side of Fig. 8a, is closed. Further, plug wires (not shown) are connected between the three plug sockets 133 (Fig. 8b) and three of the plug sockets 134 wired to the individual spots of emitter EM3. The three plug sockets 134 plugged to sockets 133 correspond to the section selecting perforations in a card column of cards CS. Thus, a perforation "4" in this column of a card CS may indicate that section #1 is to receive limits from the cards, a perforation "6" that section #2 is to receive limits from a card CS, and a perforation "7" that section #3 is to receive the limits from a card CS. For these section selecting perforations, plug wires are run from sockets 133 to the sockets 134 wired to digit spots 4, 6, and 7, of emitter EM3.

For operation under control of cards CS, a plug wire is not run between socket 125 (Fig. 8a, lower right) and the A station socket 100 of the brush for sensing the X hole, since an X hole circuit is not to be established. Instead, socket 125 is connected to the socket 100 of the brush AS for sensing the column containing the section-selecting perforations. Aside from these differences, the machine is prepared for operation and started in the same manner as described for all-limit cards CM.

When the first card fed to station A is a card with an uncut lower right hand corner, it acts on card lever CL2 to open card lever contacts CL2' at about "14" of the first cycle. Successively fed cards of this type then serve to maintain contacts CL2' open. If the first card is a CS or CSD card, which has a diagonally cut lower right hand corner (Fig. 7), it does not engage card lever CL2 at about "14" of the first cycle, so that contacts CL2' remain closed at this time (see the lower part of Fig. 6). The card CS or CSD succeeds in engaging the card lever at about "15½" of the first cycle, succeeding in opening contacts CL2' at such time. Hence, when the first card is a CS or CSD card, there is a brief extension in time of the closure of contacts CL2', such extension being indicated in Fig. 6 by the rectangular hump between "14" and "15½" of the first cycle. At "15½," the first card CS or CSD causes contacts CL2' to open. For the rest of the first cycle and until about "14½" of the second cycle, the first card rides on lever CL2 and maintains contacts CL2' open. If the second card were a C or CM or CMD card, it would engage the card lever CL2 at "14" of the second cycle to maintain card lever contacts CL2' open. However, if the second card is also a CS or CSD card, its lower right hand corner being cut, it will not engage card lever CL2 until about "15½" of the second cycle. Consequently, the contacts CL2' will reclose for a brief time, between "14½" and "15½" of the second cycle, as indicated by the rectangular hump in Fig. 6. Since the operation of the machine under control of cards CS is now being considered, the first card is a card CS.

As the first card CS enters station A, card lever contacts CL1' are closed thereby as usual. Since the right hand corner of the card is cut off, card lever CL2 is not operated in the normal way and contacts CL2' remain closed for a short period, indicated in Fig. 6. Coil R10 therefore remains energized and contacts R10a are closed. When cam contacts CC7 close, the following circuit is completed (right, bottom of Fig. 8a):

*Coil R13 circuit.*—Line 105, switch S5, contacts CC7, R9d, R10a, coil R13, to line 104.

Coil R13 closes contacts R13a establishing a holding circuit through cam contacts CC10. Coil R13 maintains contacts R13b (Fig. 8b, upper center) closed during analysis of the first limit card (occurring within the second cycle) by brushes AS, preparing one of the reset magnets RM to be selected for energization. Assuming the first card CS has a "4" perforation to select section #1 for receiving limits from this card, then at the "4" time, the following circuit forms (Fig. 8b):

*Selective reset circuit.*—Line 104, reset magnet 1RM, socket 133, the plug wire (not shown) to the socket 134 wired to digit segment "4" of emitter EM3, through the "4" emitter segment, the emitter brushes, the common segment of the emitter, normally closed R13'a contacts, the now-closed contacts R13b, a relay coil R14, a wire 135 (turn to Fig. 8a), socket 125, the plug wire (not shown) to the socket 100 of the brush AS for sensing the column containing the selection perforation "4," the contact roll 19, brush Ac, circuit breaker CB1, to line 105.

In a similar manner, other selection perforations, say "6" and "7," in the first limit card CS, would cause energization of reset magnets 2RM and 3RM.

The selected reset magnet causes the associated section of commutators AR to be reset.

Due to energization of coil R14, contacts R14a (Fig. 8b, left center) close, completing a circuit through a coil R15. Contacts R15a close, establishing a holding circuit for coil R15 through cam contacts CC13 which do not open until the "13" point of the second cycle. Cam contacts CC16 close at the "12" point of the second cycle, and with contacts R15b still closed at this time, a pick up circuit is completed through relay magnet R3. Magnet R3 closes stick contacts R3c to hold the circuit through cam contacts CC15 until after the "0" point of the third cycle. Magnet R3 opens contacts R3a and R3b, respectively in the circuit of clutch magnet PCM and the circuit of clutch magnet FCM (Fig. 8b, upper right). Accordingly, the card feed is interrupted at the end of the second cycle and card CS remains in position with its leading edge just in advance of brushes BS of station B while the following card has just reached card lever CL1 to maintain closure of contacts CL1'. The cards are thus at rest during the third cycle during which the selected section of commutators AR is reset. During the reset cycle in which the selected section is being reset, the normally open reset contacts 1Rb, 2Rb, or 3Rb, depending on which section is being reset, close. As contacts R3d are still closed at the time, a circuit is completed through one of the relay magnets R4, R5, or R6. For example, if section #1 is being reset, contacts 1Rb close, and a circuit is completed through magnet R4. If section #2 is reset, contacts 2Rb close, establishing a circuit through magnet R5. If section #3 is reset, contacts 3Rb close, completing a circuit through magnet R6. When any of these relay magnets R4, R5, or R6 is energized, its stick points R4d, R5d, or R6d close, forming a holding circuit extending through cam contacts CC9. Accordingly, the relay magnet R4, R5, or R6 continues energized until just before the "0" point of the fourth cycle which follows the reset cycle. Just before "11" of the third cycle, cam contacts CC15 opened, breaking the stick circuit of coil R3. Accordingly, contacts R3a and b in the circuits of clutch magnets PCM and FCM reclose. The clutch magnet FCM then becomes energized so as to cause feed of the card CS through station B during the cycle following reset. However, magnet PCM remains deenergized because of contacts R4a, R5a, or R6a one of which has been opened by the energized one of magnets R4, R5, and R6 which remain operative until cam contacts CC9 open after the digit sensing period 9 to 1 of the fourth cycle. Accordingly, the second card, which during the second cycle was fed to a position just in advance of brushes AS, will remain there until after the limits are read out of the card CS passing through station B.

The energized magnet R4, R5, or R6 shifts the related gang of transfer contacts R4c, R5c, or R6c (Fig. 8a), thereby connecting sockets 132 to the entry magnets EM of the selected commutator section. Accordingly, as the card CS passes through station B, the limit values are sensed by those brushes BS whose sockets 101 are plug-connected to sockets 132, thereby closing circuits energizing magnets EM of the selected section. The limits are thereby entered from this card CS into the selected section. The energized magnet R4, R5, or R6 also opens its contacts R4b, R5b, or R6b in the limit sorting circuit of sorting magnet SM, causing card CS to go to the reject pocket. At the end of the entry period of the cycle during which card CS is passing through station B, cam contacts CC9 open, breaking the stick circuit of the magnet R4, R5, or R6. Accordingly, the R4a, R5a, or R6a contacts reclose, establishing the circuit of clutch magnet PCM. As a result, the second card is fed through station A. If the second card is a detail card, it will be sorted according to the limit areas defined in sections #1, #2, and #3 of which one of the sections will have a new limit derived from the first card which was a limit card CS and of which the other sections will have retained their previous limits. If the second card is also a limit card CS, new limits will be entered into another section of commutators AR. It will be recalled that for the first two cycles, clutch magnet PCM was energized. During the first cycle, the first limit card CS was fed to the beginning of station A and due to its specially cut right hand corner (Fig. 7), it permitted contacts CL2' to remain closed until after the "15" cycle point thereby maintaining coil R10 (Fig. 8b) energized for this additional period. As a result, closure of contacts CC7 completed the coil R13 circuit, extending also through contacts R10a, and this circuit was held through cam contacts CC10 until "13" of the second cycle (see Fig. 6). Coil R13 closed contacts R13b to permit the selective reset circuit to be formed during the second cycle. Coil R14 in this circuit closed contacts R14a to pick up coil R15. Coil R15 was held through cam contacts CC13 until the "13" point of the second cycle, maintaining contacts R15b closed, so that when cam contacts CC16 closed at "12" of the second cycle, relay magnet R3 was picked up. Magnet R3 thereupon opened contacts R3a and R3b, respectively in the PCM and FCM clutch magnet circuits. Thus, substantially at "12" of the second cycle, the PCM magnet circuit is broken. In parallel with magnet PCM is the coil PCM' (Fig. 8b, right). When the PCM circuit is broken, coil PCM' is deenergized, permitting contacts PCM'a (Fig. 8b) to close. At "15" of the second cycle, cam contacts CC18 close, and with contacts PCM'a also closed, a coil R13' is picked up. Coil R13 was deenergized at "13" of the second cycle when cam contacts CC10 opened. During the second cycle, the first card is feeding through station A as explained before and is holding contacts CL2' open until shortly before "15" of the second cycle. Also, during the second cycle, the second card is feeding out of the hopper and to station A. If the second card is a limit card CS, it will have the right corner cut and will permit contacts CL2' to close for a period overlapping point "15" of the second cycle. As a result, relay magnet R13 will be picked up again by the coil R13 circuit (bottom of Fig. 8a). At "12" of the second cycle, coil PCM' was deenergized, contacts PCM'a closed, and at "15" of the second cycle, cam contacts CC18 closed, completing the circuit of coil R13'. Coil R13' is held energized through cam contacts CC19 and stick points R13'b until after point "14" of the third cycle. Coil R13' opens contacts R13'a in the selective reset circuit (top, left of Fig. 8b) so that during the third cycle, when the cards are at rest and station A brushes AS are wiping the bare contact roll 19, none of the reset magnets RM can be energized. During the third cycle, coil R13' will be held by cam contacts CC19 until shortly before the "15" point. Coil R13 which was energized during the second cycle at "15" would normally be held by cam contacts CC10 and its stick contacts R13a until only "13" of the third cycle. But at "15" of the second cycle, coil R13' was energized and does not deenergize until after "14" of the third cycle. Coil R13' closed contacts R13'c (bottom of Fig. 8a) which are in shunt with cam contacts CC10 and will hold coil R13 energized until shortly before "15" of the third cycle. As cam contacts CC10 reclosed at "14" of the third cycle, coil R13 will be held thereby until "13" of the fourth cycle. Throughout the third cycle, clutch magnet PCM is deenergized and the picker feed is idle. Also, coil PCM' is deenergized during the entire third cycle, permitting contacts PCM'a to remain closed. Consequently, coil R13' is again picked up at "15" of the third cycle and held through cam contacts CC19 until shortly before "15" of the fourth cycle. Hence, during the fourth cycle, when cam contacts CC10 open at "13," contacts R13'c are still closed and maintain the coil R13 energized until cam contacts CC10 reclose. Coil R13 will then remain energized until "13" of the fifth cycle at which point cam contacts CC10 reopen. During the fourth cycle, one of the coils R4, R5, and R6 remained energized through cam contacts CC9 until shortly before "0," and the a contacts of one of these coils prevented energization of the picker clutch magnet, so that the second card did not feed during the fourth cycle, as explained before. When cam contacts CC9 reopen, the coil R4, R5, or R6 is deenergized, its a points reclose and magnet PCM and parallel coil PCM' are energized. Thus, coil R13' will not be picked up during the fourth cycle, and contacts R13'a will stay closed during the fifth cycle. During the fifth cycle, the second limit card CS is feeding through station A and with coil R13 still energized and holding contacts R13b closed and with contacts R13'a also closed, a selective reset circuit will be established in accordance with the analysis by station A analyzer of a section-selecting perforation in the second limit card. The subsequent reset and entry of new limits in the second selected section will then take place in the manner described for the first limit card. The third card, if a limit card CS, will initiate the same train of operations as described for the second limit card CS to enter new limits into still a third section of the commutators. The detail cards will follow and will be sorted according to the limits in the same manner as described before.

*Operations controlled by cards CSD.*—A card CSD (Fig. 7) for section #1 has the upper and lower limits while a card CSD for section #2 or #3 has only the upper limit for its section. In addition, a card CSD has a "12" perforation which serves in the manner described for a card CMD to set the machine automatically for sorting according to adjoining limits. The other operations controlled by cards CSD are the same as described for cards CS.

*Data entering according to limit areas*

The selective sorting of detail cards into different pockets according to whether detail values on these cards lie within one or another set of limits has been explained. In addition to or besides such sorting according to different limit ranges, means may be provided to selectively control entries from detail cards into accumulators according to whether detail values fall within one or another set of limits. Accumulators of the type AR shown in Fig. 5 may be used. For example, three such accumulators may be provided to the right of section #3 shown in Fig. 3. The operating means for the additional accumulators are the same as for the AR accumulators. The additional accumulators may be referred to as Acc. 4, Acc. 5, and Acc. 6. Fig. 9 shows the supplemental circuits for controlling entries into the additional accumulators which are represented in this figure by their entry magnets EM.

The limits are set up in sections #1, #2, and #3 in the same way as described before. For the sake of simplicity, only one set of limit ranges is set up for each stack of cards. For example, if the limits are manually selected, the stack will contain only detail cards, entries from all of which will be controlled by the same set of limit ranges. If the limits are to be set up automatically by an all-limit card CM or CMD, only one such card will be used for each stack and be placed at the head of the stack. If the limits are to be determined by single-limit cards CS or CSD, only one set of such cards will be used for each stack and will precede the detail cards. The detail control field of the detail cards which is to be compared with the limit ranges may be one of the data fields from which selective entry is to be made or may be a field other than any of the data fields. The selected detail control field will be associated with coils EH, ET, and EU and GH, GT, and GU (Fig. 8a) in the same manner as described before. As the detail control field is passing through analyzing station A, the detail control value is sensed at differential times of a cycle and times the energization of the E and G coils. During this same cycle, the limits are read out to time the energization of the LH, LT, LU, SH, ST, and SU limit readout coils (Fig. 8b). In accordance with which of the limit areas contains the detail control value, one of the 1A, 2A, or 3A coils is energized and held through cam contacts CC3 until "12" of the next cycle. During this next cycle, the card from which the detail control value was read out passes through analyzing station B. When one of the coils 1A, 2A, or 3A is energized, it closes contacts (Fig. 9) which may be the same as the b contacts of Fig. 8a. These b contacts of coils 1A, 2A, and 3A are connected to line 105 through the safety contacts R1b, R4b, R5b, and R6b, just as before. Plug wires (not shown) are run between sockets 110 wired to contacts 1Ab, 2Ab, and 3Ab and sockets 110'. Each of the plug sockets 110' is wired to a relay magnet 1A', 2A', or 3A'. Thus, when one of the b contacts of coil 1A, 2A, or 3A is closed during a cycle, it will complete a circuit through the magnet 1A', 2A', or 3A'. This circuit will remain in effect until "12" of the following cycle during which the detail card is being analyzed at station B. The B station sockets 101 of the brushes BS for sensing the data fields from which the entries are to be made are connected by plug wires (not shown) to sockets 150. These sockets 150 are connected through normally open contacts 1A'a, 2A'a, and 3A'a to sockets 151. Plug wires are selectively run from sockets 151 to sockets 152 wired to the entry magnets EM of Acc. 4, Acc. 5, and Acc. 6 (Fig 9). The plug wire connections between sockets 101 and 150 may be selectively made. For example, if entries from one data field are to be made in Acc. 4, then the sockets 101 associated with the brushes for sensing this data field are connected by plug wires to sockets 150 of Acc. 4, if entries from a second data field are to be made into Acc. 5, the sockets 150 of this accumulator are connected to the sockets 101 associated with the second card field. Entries from a third card field may be made into Acc. 6 by connecting the sockets 150 of the latter accumulator to the sockets 101 associated with the third card field. For this type of operation, the sockets 151 are plugged to the sockets 152 directly below. Entries into the accumulators then occur according to the limit area in which the detail control value falls. Assume, for example, that entries are to be made into Acc. 4 from a first data field if the central value is within the limits of the area defined by section #1, that entries from the second card field are to be made into Acc. 5 if the control value is within the limits defined by section #2, and that entries from the third data field are to be made into Acc. 6 when the control value is within the limits of section #3. For this example, the 1Ab contacts are plugged to the magnet 1A', the 2Ab contacts to the magnet 2A', and the 3Ab contacts to the magnet 3A'. If the control value on a detail card falls within the limits of section #1, then magnet 1A' is energized, closing its contacts 1A'a. During the next cycle, in which the detail card is passing through station B, the values represented in the first data field will be entered in Acc. 4. For instance, assuming the first data field has a "3" in the units column, then at the "3" time of a cycle, the following entry circuit will be established (Fig. 9):

*Selective entry circuit.*—Line 105, circuit breaker CB2, switch S1 in full line position, contacts R11b, brush Bc, contact roll 25, the brush BS sensing the units order column of the first data field, the socket 101 thereof, the plug wire (not shown) to socket 150 of the units order of Acc. 4, the connected pair of contacts 1A'a, a plug socket 151, the plug wire (not shown) to the socket 152 below, the units order entry magnet EM of Acc. 4, to line 104.

Instead of selectively entering data from one of three data fields into one of the three accumulators Acc. 4, Acc. 5, and Acc. 6 according to which of the limit ranges contains the detail control value, the machine may be plugged to selectively enter data from one data field into one of the accumulators according to the limit range containing the control value. For this type of operation, the sockets 101 associated with one data field will be plugged to the sockets 150 of all three accumulators. Then, if a control value is within the limits of section #1, contacts 1A'a will be closed and the value in the data field will be entered in Acc. 4; if the control value is within the limits of section #2, the value in the data field will be entered in Acc. 5; and if the control value is within the limits of section #3, the value in the data field will be entered in Acc. 6.

If desired, the machine may be plugged to cause entries to be made from one of three data fields into one accumulator, with the field being selected according to which limit area contains the detail control value. For this type of operation, the sockets 101 associated with the three card fields will be plugged to the sockets 150 directly below. Further, plug connections will be made from the multiple sockets 152 of one accumulator; for example, Acc. 4, to the sockets 151 wired to the three banks of contacts 1A'a, 2A'a, and 3A'a. Then, if the control value is within the limits of section #1, contacts 1A'a will be closed and the data of the first data field enters in Acc. 4; if the control value is within the limits of section #2, the data of the second data field enters Acc. 4; and if the control value is within the limits of section #3, the data of the third data field enters Acc. 4.

At the end of a run, the operator reads the visible indicator wheels 61 of the accumulators and makes a record of the total or totals standing in the accumulators. The accumulators may then be reset, if desired, by depressing a manual reset key to close contacts KR. After the last card has passed station B, card lever contacts CL3' will open, coil R11 (Fig. 8b) will be deenergized, and contacts R11c will reclose. The manual closure of key contacts KR will then complete a circuit through reset magnets 4RM, 5RM, and 6RM of Accs. 4, 5, and 6. The start key will also be depressed to energize magnet R8 which will close its a contacts to set motor M in operation. The resetting of the accumulators Accs. 4, 5, and 6, will then take place.

*Selective printing under control of limit areas*

Fig. 10 shows the supplemental wiring diagram for a modification in which data from a detail card may be selectively printed according to whether the detail control is within one or another set of limits. For this modification, banks of printing magnets PM are substituted for the entry magnets EM of Fig. 9. In the same manner as in the previous modification, the magnets PM will be selectively energized according to which limit area contains the detail control value. For the printing modification, a print clutch magnet PMC is provided and energized upon closure of contacts R11d resulting from energization of coil R11. Coil R11 will be energized when the first card enters station B and will remain energized while detail cards are feeding through station B. During this time, clutch magnet PMC will be energized to couple the drive shaft 53 (see also Fig. 3) to the print cam shaft 160. A cam 161 on this shaft will cause reciprocation of the type bars 162 once each cycle. Each type bar carries individual types 163 for printing digits 0 to 9, the "9" type being uppermost and followed by the "8" type, and so on down to the "0" type. Cam 161 will elevate the type bars in synchronism with the sensing of successive perforation positions 9 to 0 by the station B analyzer. As a detail card passes through station B, a detail value in an order will be sensed at a differential time of a cycle to energize the printing magnet PM of this order. Magnet PM thereupon will release a latch 165 to stop the type bar with the type corresponding to the sensed detail value in printing position opposite a platen 166. Hammers (not shown) will be tripped to cause the selected types to effect printing operation so as to print the detail value on the sheet lying on platen 166. The timing of the printing operation and the restoration of the parts will take place in the manner described in Patent No. 1,976,617. Line spacing will take place each cycle in a known manner through means such as disclosed in the latter patent.

While there has been shown and described and pointed out the fundamental novel features of the invention as applied to several embodiments, it will be understood that various omissions and substitutions and changes in the form and details of the devices illustrated and in their operations may be made by those skilled in the art without departing from the spirit of the invention. It is the intention therefore to be limited only as indicated by the scope of the following claims.

What is claimed is:

1. Apparatus for handling records on which control data are designated, comprising a plurality of limit representing means variably settable to represent concurrently determinative lower and upper limits of each of a plurality of different limit ranges, means for analyzing the records in succession for control data designations thereon, means conjointly controlled by the analyzing means during analysis of each record and by the limit representing means for ascertaining the magnitude of the control data designated on each analyzed record concurrently with respect to the several upper and lower limits of the different ranges, control means selectively operated under control of the ascertaining means according to which of the different limit ranges embraces the control data on the analyzed record, and sorting means to sort the records to different destinations including means selectively controlled by said control means for causing each analyzed record to be sorted to one destination or another depending on which limit range has been found to encompass the control data on the record.

2. A cyclically operable machine comprising means for sensing records, one each cycle, for control data designations on the records, a plurality of representing means variably settable to represent upper and lower limits of each of a plurality of limit ranges, means controlled each cycle by the sensing means, while sensing a record, and by the limit representing means to determine whether the control data of the record sensed during the cycle is within one or another or none of the plurality of limit ranges, elements to segregate the records into separate groups during a single run of the records through the machine, and operating means controlled by the determining means for operating the elements to segregate the record, whose control data has been sensed during the cycle, in one of the groups depending on whether the control data of this record are within one range or another or none of the limit ranges.

3. A machine for handling a series of detail records preceded by a plurality of successive limit records, comprising means for analyzing the records for data designations thereon, a plurality of sections of limit representing means to represent upper and lower limits of a plurality of limit ranges, means controlled by the analyzing means according to limits designated on the successive limit records for setting the representing means of one section to the limit or limits designated on one of the limit records and the representing means of another section to the limit or limits designated on a following limit record, and means controlled by the sections according to their limits and by the analyzing means according to data designated on each of the detail records following the limit records for determining which of the limit ranges encompasses the data, and machine control means controlled selectively by the determining means according to the determination effected thereby of which limit range encompasses the data.

4. Apparatus for handling successive records on which data are designated, comprising a lower limit representing means and an upper limit representing means settable to represent lower and upper limits of a limit range, devices for sensing limit data designations on a record, means controlled by the aforesaid sensing devices according to the sensed limit data designations for setting the representing means to the limits of a certain range, elements to separate the records into different groups, devices to sense control data designations on a plurality of records, one record after another, following the record from which limit data was derived, means controlled by the representing means according to their settings and by the latter sensing devices according to control data designated on each of such following records for detecting whether the limits encompass the control data, and means effective under control of the detecting means for controlling the elements to separate such following records whose control data are within the limits from the such following records whose control data are outside the limits.

5. In a machine for handling records, a plurality of sections of limit representing means settable to represent concurrently determinative lower and upper limits of each of a plurality of limit ranges, elements for sensing a record for designations of a plurality of limits pertaining to the different sections, means controlled by the said sensing means for setting the representing means of the plurality of sections according to the limits pertaining to the different sections and designated on the latter record, elements for sensing control data designations on each of a succession of records following the record from which the limits were derived, means controlled jointly by the latter sensing elements and the representing means for determining which of the limit ranges encompasses the control data, and machine control means selectively controlled by the determining means according to the determination effected thereby of which of the limit ranges encompasses the control data.

6. A machine for handling a series of detail records and a plurality of preceding successive limit records, comprising means for sensing the limit records for designations of limit data, a plurality of sections of limit representing and storing means to represent and store upper and lower limits of a plurality of different limit ranges, means controlled by said sensing means according to limits designated on the successive limit records for setting the representing means of one section to the limit or limits designated on one limit record and the representing means of another section to the limit or limits designated on a following limit record, means to sense the detail records for control data designations, comparing means controlled by the sections according to the limits stored therein and by the latter sensing means according to control data designated on each of the detail records following the limit records for determining the magnitude of the control data with respect to the limits of each of the ranges, and means selectively controlled by the comparing means according to which of the limit ranges encompasses the control data designated on each such detail record.

7. Apparatus for handling records on which control data are designated, comprising a plurality of limit storing means variably settable to store lower and upper limits of a plurality of successive limit ranges, means to sense the records successively for control data designations, a plurality of pairs of upper and lower limit comparing organizations, one such separate pair for each limit range, the lower and upper limit comparing organizations of each pair respectively including lower and upper limit manifesting means operated under control of the storage means for the lower and upper limits of the range related to the pair and in accordance with the magnitude of the limits, all said organizations individually including control data manifesting means commonly operated under control of the record sensing means and in accordance with the magnitude of the control data designated on a sensed record, whereby comparison of the relative magnitude of the control data with respect to the lower and upper limits of the plurality of ranges may be concurrently determined by coaction of the limit and control data manifesting means in each organization, comparison manifesting means in each organization controlled by coaction of the limit and control data manifesting means therein for operation in accordance with whether the limit or control data is greater, correlating means associated with each range controlled by the comparison manifesting means of the pair of organizations of the range for correlating the comparisons between the control data and the lower and upper limits of the range to determine thereby whether the control data is encompassed by the limits of the range, and means selectively operated by the correlating means associated with the different ranges according to whether the limits of one range or another encompass the control data.

8. Apparatus such as defind in claim 7, in which a pair of adjacent limit ranges may be adjoining ranges having a common limit which is the lower limit of one of the adjoining ranges and the upper limit of the other adjoining range, selectively conditionable means conditionable to place the limit manifesting means of the adjacent comparing organizations of the adjoining ranges under control of a single common limit storing means, and means for conditioning the selectively conditionable means in this manner.

9. Apparatus comprising record distributing elements selectively operable to distribute records, bearing control data designations, to different destinations, means for analyzing the records for control data designations, mechanism to feed the records successively to the analyzing means and to the distributing elements, a plurality of limit representing means settable to represent concurrently determinative upper and lower limits of each of a plurality of different limit ranges, means conjointly controlled by the analyzing means during analysis of each record, according to the control data designations of each record, and by the limit representing means for ascertaining the magnitude of the control data designated on each analyzed record concurrently with respect to the limits of the plurality of ranges, a plurality of control devices operated selectively under control of the ascertaining means, one device when one of said ranges encompasses the control data and another said device when another of the ranges encompasses said control data, and means selectively controlled by said devices, according to which has operated, for controlling operation of the distributing elements to distribute each record to one destination or another depending on whether the control data designated thereon are encompassed by one limit range or another.

10. A cyclically operating machine for handling limit records and control records, comprising the combination with sorting elements to sort records into groups, of means for sensing limit records for lower and upper limit data designations, settable lower limit storing and representing means and settable upper limit storing and representing means, means under control of said sensing means for setting the lower and upper limit storing and representing means to store and represent sensed lower and upper limit data, means for sensing the control records, subsequently to the setting of the representing means with limit data, one record each cycle for control data designations, means controlled by the latter sensing means and by the representing means, each said cycle, to compare the control data of each control record with the same retained settings of the two representing means to determine whether the control data of each control record are encompassed by the same lower and upper limit data, a control device selectively operated by the comparing means each cycle in accordance with whether the control data on the record analyzed each cycle are encompassed by the same lower and upper limit data, mechanism for feeding each control record through the sensing means therefor and thereafter to the sorting elements, and means controlled by said device according to its selective operation for governing said elements to selectively sort the control records.

11. Apparatus operable in accordance with whether control data designated on records are encompassed by lower and upper limits of one range or of a different range, comprising lower and upper limit representing means for each range, lower and upper limit manifesting means for each range operated under control of the related limit representing means, mechanism for feeding the records, one after another, to a sensing station, means at the station to sense each record for control data designations, a plurality of means operated under control of the sensing means according to the control data designated on each sensed record to manifest the control data, one such control data manifesting means being associated with each limit manifesting means of the different ranges, upper and lower limit and control data comparison devices for each range, means controlled by coaction of the related limit manifesting means and control data manifesting means to selectively condition each said comparison device according to whether the limit or control data is greater in magnitude, whereby the lower and upper limit and data comparison devices for each range are selectively conditioned according to whether the lower and upper limits of each range are respectively greater or less in magnitude than the control data, comparison correlating devices, each associated with one of the ranges and selectively conditioned under control of the limit and data comparison devices according to whether the lower and upper limits of the range encompass the control data, whereby the comparison correlating devices of the different ranges by their selective conditioning manifest which of the limit ranges encompasses the control data, and means common to all said correlating devices and selectively operated under control of said comparison correlating devices according to the selective conditioning of the latter devices.

12. In a machine for handling records bearing denominationally ordered value representations of detail values, sorting means to separate the records into groups during a run of the records through the machine, denominationally ordered means settable to represent the upper limit of a range and similar means settable to represent the lower limit of the range, means for sensing the records in succession for the representations of the detail values, lower limit and detail value comparing means including a group of denominationally ordered relays, circuits for said relays including contacts controlled by the lower limit representing means and contacts controlled by the sensing means for selectively operating said relays according to the relative magnitude of the corresponding orders of the lower limit and of the detail value derived from a sensed record, circuit connections between the relays of said group for causing a higher order relay of the group to operate when the detail value and the lower limit value in the corresponding higher orders are equal and the lower limit value in the lower order is less than the detail value in the lower order, upper limit and detail value comparing means including a second group of denominationally ordered relays, circuits for the latter relays including contacts controlled by the upper limit representing means and contacts controlled by the sensing means for selectively operating the relays of the second group according to the relative magnitude of the corresponding orders of the upper limit and of the detail value derived from the sensed record, circuit connections between the relays of the second group for causing a higher order relay to operate when the detail value and the limit value in the corresponding higher orders are equal and the upper limit value in the lower order is greater than the detail value in the lower order, and means controlled by the two groups of relays according to their selective operation for causing the sorting means to separate the records whose detail values lie within the range of limits from the records whose detail values are outside said range.

13. Apparatus comprising a plurality of lower and upper limit representing means for representing the lower and upper limits of a plurality of ranges, lower and upper limit manifesting means for each range, means for operating the limit manifesting means of each range under control of the representing means for the limits of the related range, means to select control data, a plurality of means to manifest the control data, means controlled by the data selecting means to operate the control data manifesting means, one such control data manifesting means being related with each limit manifesting means of the different ranges, comparison devices, one associated with each limit of each range, means controlled by coaction of the related limit manifesting means and control data manifesting means to selectively operate the associated comparison device according to whether the related limit or the control data are the greater, comparison correlating devices, one for each range, each latter device controlled by the comparison devices of the associated range for correlating the upper and lower limit and control data comparison results for the range to determine whether the control data are encompassed by the limits of the range, and means selectively controlled by the comparison correlating devices of the different ranges in accordance with which of the ranges encompasses the control data.

ARTHUR H. DICKINSON.